United States Patent [19]

Hashimoto et al.

[11] Patent Number: 4,982,567
[45] Date of Patent: Jan. 8, 1991

[54] AIR SUPPLY CONTROL SYSTEMS FOR TURBOCHARGED INTERNAL COMBUSTION ENGINES

[75] Inventors: Takayoshi Hashimoto; Masanori Shibata; Haruo Okimoto; Seiji Tashima; Kaoru Yamada; Toshimichi Akagi; Ritsuharu Shimizu; Masaru Yamamoto; Masashi Ohmori, all of Hiroshima, Japan

[73] Assignee: Mazda Motor Corporation, Hiroshima, Japan

[21] Appl. No.: 300,927

[22] Filed: Jan. 24, 1989

[30] Foreign Application Priority Data

Jan. 29, 1988 [JP] Japan ................... 63/019084
Jan. 31, 1988 [JP] Japan ................... 63/020968
Jan. 31, 1988 [JP] Japan ................... 63/020969
Jul. 30, 1988 [JP] Japan ................... 63/191652

[51] Int. Cl.⁵ ............................. F02B 37/12
[52] U.S. Cl. ........................... 60/600; 60/612
[58] Field of Search ............... 60/600, 603, 612

[56] References Cited

U.S. PATENT DOCUMENTS 4,418,536 12/1983 Deutschmann ............ 60/612 X
4,557,111 12/1985 Hanssmann et al. ........ 60/612 X
4,709,552 12/1987 Rutschmann et al. ...... 60/612 X
4,781,027 11/1988 Richter et al. ............... 60/612 X

FOREIGN PATENT DOCUMENTS 41417 4/1981 Japan .
41418 4/1981 Japan ................... 60/612
12177 3/1982 Japan .
160022 9/1984 Japan .
169630 9/1985 Japan ................... 60/612
178329 11/1985 Japan .
259722 12/1985 Japan .
38124 2/1986 Japan .
275531 12/1986 Japan .

*Primary Examiner*—Michael Koczo
*Attorney, Agent, or Firm*—Sixbey, Friedman, Leedom & Ferguson

[57] ABSTRACT

An air supply control system for an internal combustion engine comprises at least first and second turbosupercharger, an exhaust cutoff valve operative selectively to open and close an exhaust passage in which a turbine of the second turbosupercharger is disposed, an intake air cutoff valve operative selectively to open and close an intake passage in which a blower of the second turbosupercharger is disposed, a cutoff valve controller operative to control the exhaust cutoff valve and the intake air cutoff valve so as to cause the first turbosupercharger to work when intake air mass flow fed to the engine is to be relatively small and to cause both of the first and second turbosuperchargers to work when intake air mass flow fed to the engine is to be relatively large, an engine operation detector, and an operation controller operative to vary, in response to an engine operating condition detected by the engine operation detector, a boundary between first and second operating areas provided on an operating characteristic chart of the engine respectively for a first supercharging operation in which the first turbosupercharger works but the second turbosupercharger does not work and a second supercharging operation in which both of the first and second turbosuperchargers work.

15 Claims, 17 Drawing Sheets

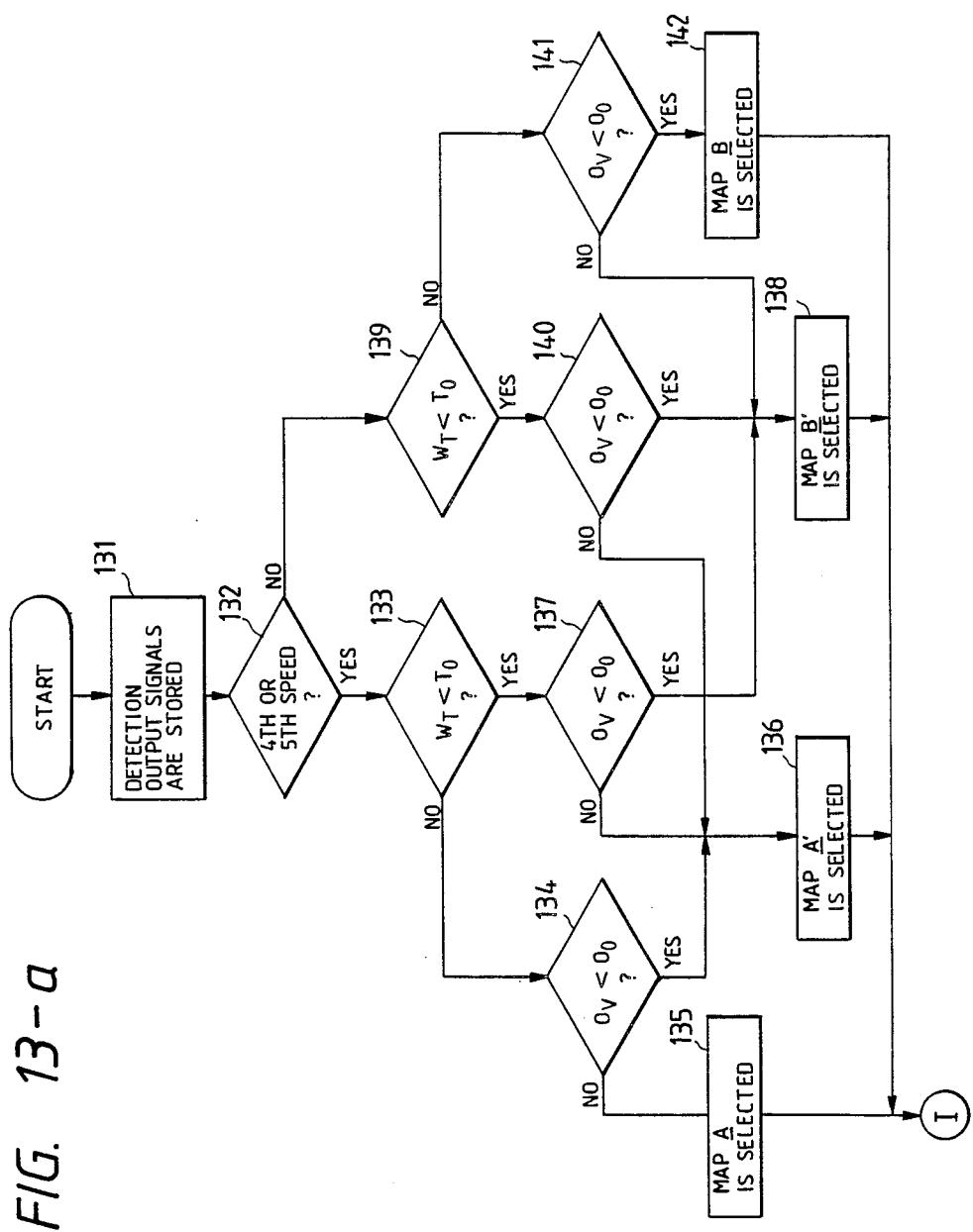
FIG. 13-a

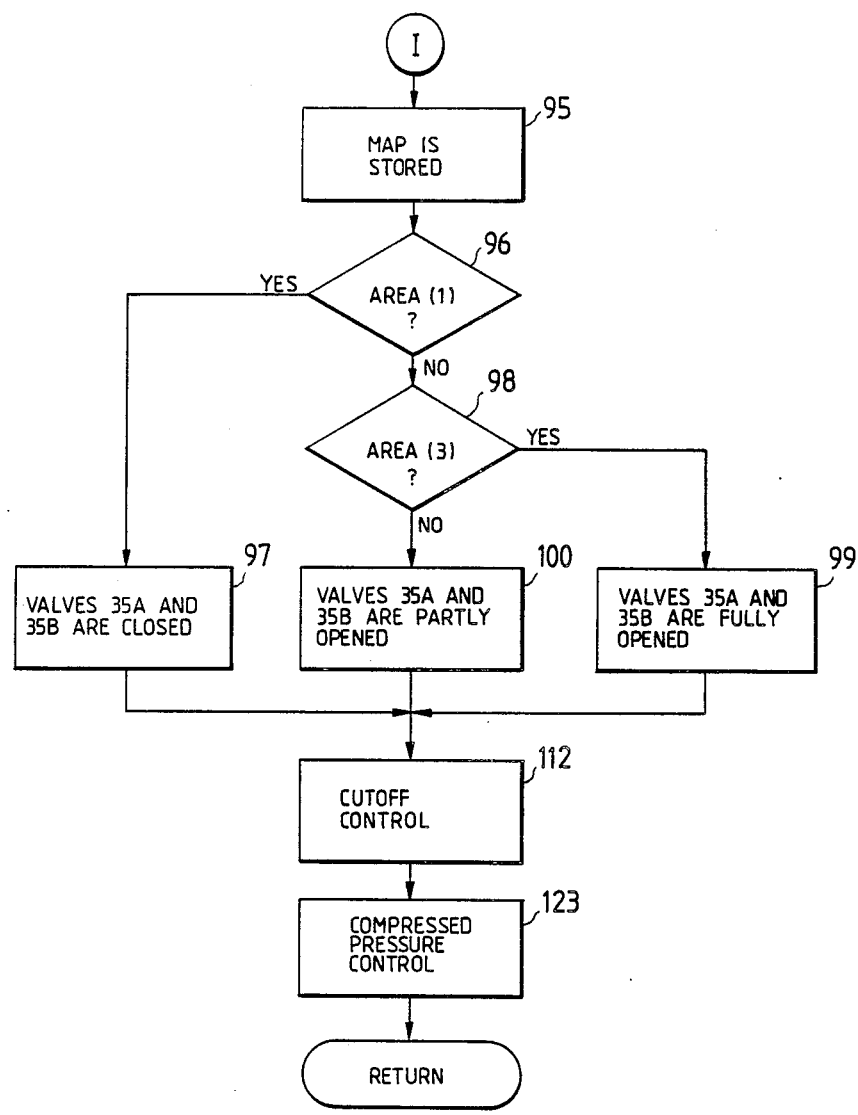
FIG. 13-b

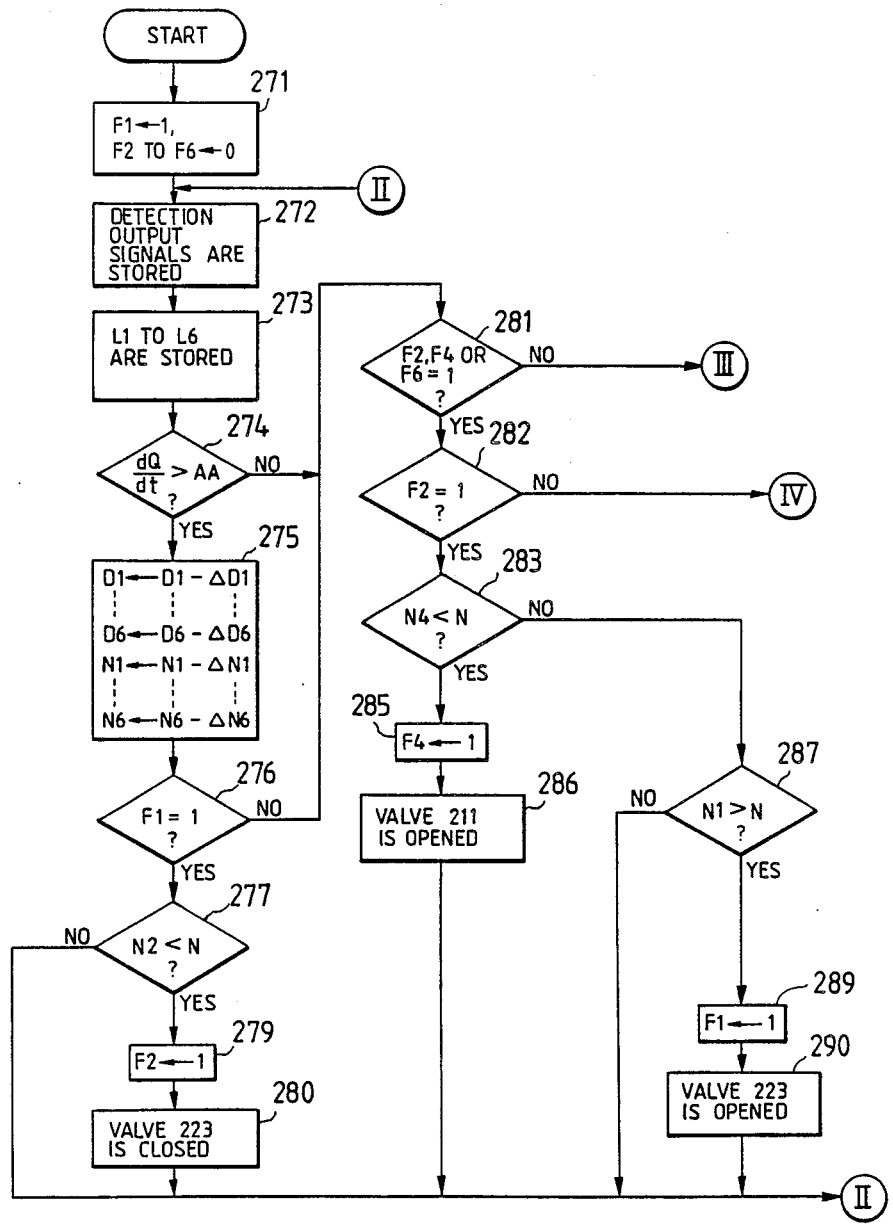
FIG. 19-a

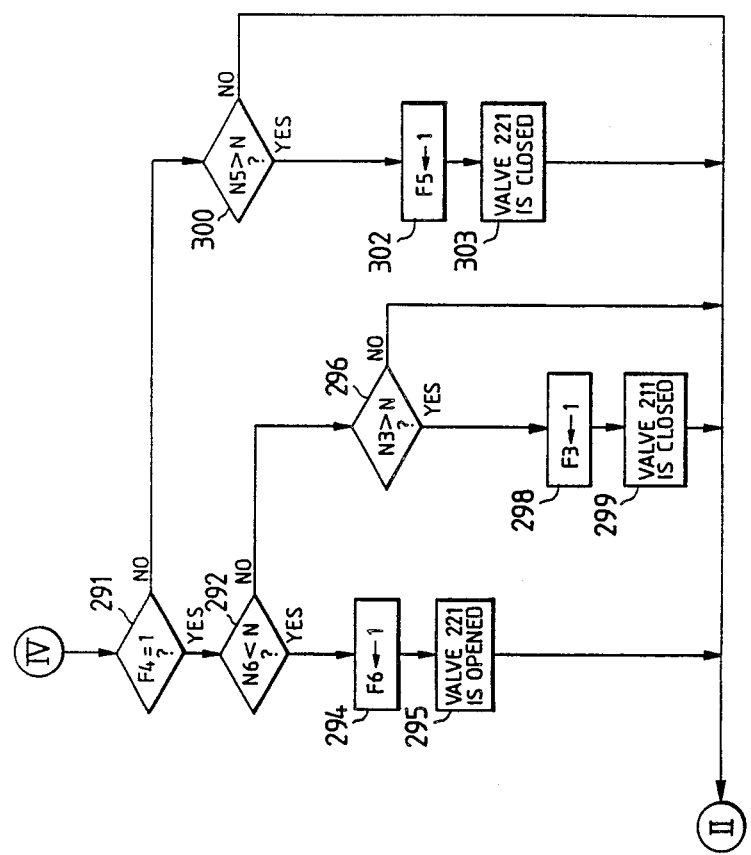
FIG. 19-b

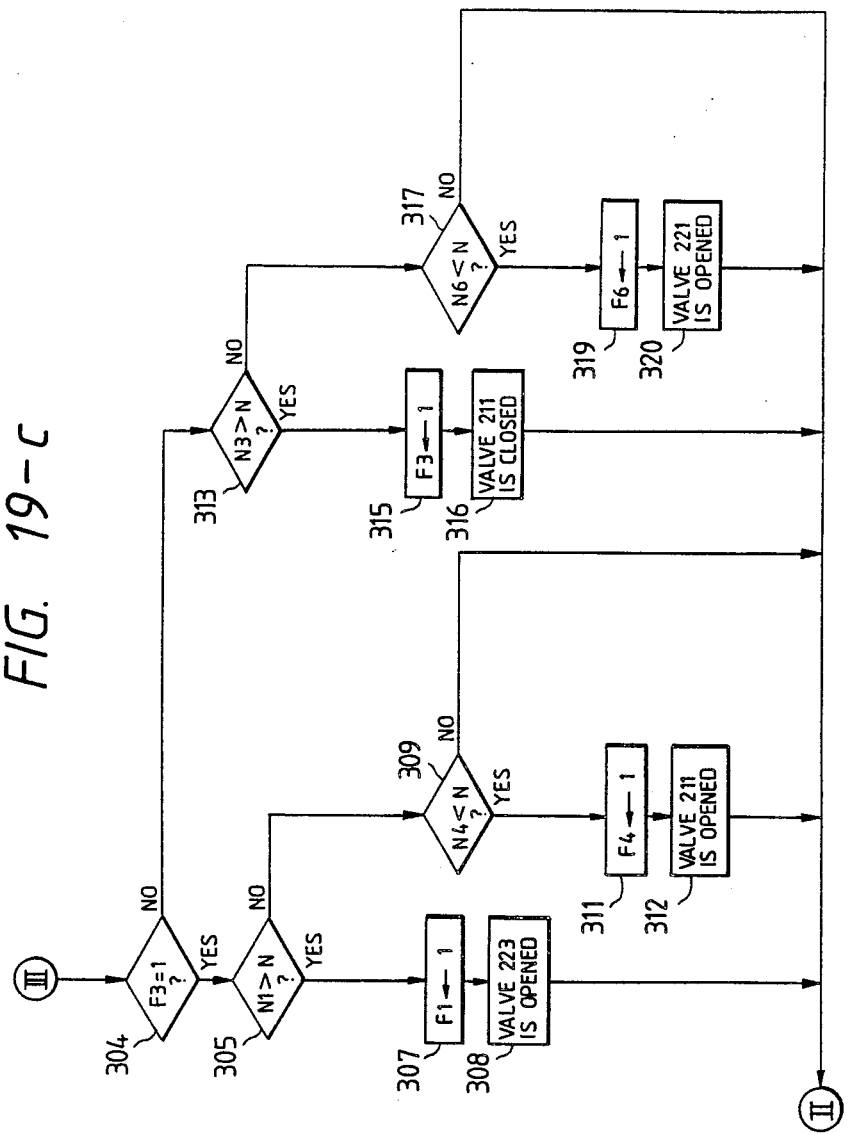
FIG. 19-c

AIR SUPPLY CONTROL SYSTEMS FOR TURBOCHARGED INTERNAL COMBUSTION ENGINES

BACKGROUND OF THE INVENTION

1. Field of the Invention

The present invention relates generally to air supply control systems for internal combustion engines, and more particularly to a system for controlling air supply effected to an internal combustion engine by a plurality of turbosuperchargers accompanying with the internal combustion engine.

2. Description of the Prior Art

In an internal combustion engine equipped with a turbosupercharger, a superior response in supercharging would not be expected, especially, under a situation wherein the engine is operating at a relatively low speed in the case where the turbosupercharger is arranged to be large in supercharging capacity and further it would not be expected that a combustion chamber in the engine is supercharged sufficiently as occasion demands in the case where the turbosupercharger is arranged to have an improved response in supercharging.

In view of the above, there has been proposed to provide a couple of turbosuperchargers of primary and secondary to an internal combustion engine and to make only the primary turbosupercharger operate when intake air mass flow in an intake passage of the engine is relatively small and make both the primary and secondary turbosuperchargers operate simultaneously when the intake air mass flow is relatively large, as disclosed in, for example, Japanese patent applications published before examination under publication numbers 56-41417 and 59-160022, respectively, and Japanese utility model application published before examination under publication number 60-178329. In such a case, a superior response in supercharging can be obtained even on the occasion of engine operation at a relatively low speed and a combustion chamber in the engine can be supercharged sufficiently on the occasion of engine operation at a relatively high speed with an arrangement in which the primary turbosupercharger is made to have an improved response in supercharging.

In connection with the internal combustion engine provided, as mentioned above, with the primary and secondary turbosuperchargers which are caused to work selectively so as to vary their supercharging capacity in accordance with operating conditions of the engine, first and second operating areas provided on an operating characteristic chart of the engine, which may be shown with an axis of abscissa representing engine speed and an axis of ordinate representing opening degree of throttle in the engine, are predetermined respectively for a first supercharging operation whereby only the primary turbosupercharger is to work and a second supercharging operation whereby both the primary and secondary turbosuperchargers are to work simultaneously. (Hereinafter, the first and second operating areas will be referred to as P and S operating areas, respectively.) These P and S operating areas are generally determined with reference to a condition in which the engine operates with an appropriate temperature after having been warmed up sufficiently.

However, in the engine which is provided with the primary and secondary turbosuperchargers and for which the P and S operating areas are fixedly predetermined as mentioned above, the primary and secondary turbosuperchargers are also caused often to work simultaneously when the engine is operating with a relatively low temperature before having been warmed up sufficiently and this results in a disadvantage that an exhaust gas which is discharged from the engine to be applied to an exhaust emission purifying catalyzer is made too low in temperature so as to be unfavorable for early activation of the exhaust emission purifying catalyzer. The reason why the exhaust gas is made too low in temperature is that the exhaust gas is used to drive both of the primary and secondary turbosuperchargers in a relatively low temperature environment and therefore loses a great deal of thermal energy at the primary and secondary turbosuperchargers so as to decrease the temperature thereof steeply and to be hard to increase in temperature when the primary and secondary turbosuperchargers work simultaneously.

In the engine which is provided with the primary and secondary turbosuperchargers and for which the P and S operating areas are fixedly predetermined, there is another disadvantage that the primary and secondary turbosuperchargers can not satisfy enough all desires in operation raised respectively in accordance with speed ranges taken selectively in a transmission which is connected to the engine for transmitting torque generated by the engine to a drive mechanism for driving wheels of a vehicle equipped with the engine.

In more detail, it is desirable that the combustion chamber in the engine is supercharged with quick response when a low speed range, such as the first or second speed range, is selected in the transmission for acceleration or deceleration, and further supercharged smoothly when a high speed range, such as the third or fourth speed range, is selected in the transmission for causing the vehicle to travel steadily at relatively high speed. Accordingly, the primary and secondary turbosuperchargers are desired to work simultaneously when the low speed range is selected in the transmission until the engine speed on the increase becomes relatively high and also when the high speed range is selected in the transmission until the engine speed on the decrease becomes relatively low. However, in the case where the P and S operating areas are fixedly predetermined, the primary and secondary turbosuperchargers can not comply appropriately with such a desire.

In the engine which is provided with the primary and secondary turbosuperchargers and for which the P and S operating areas are fixedly predetermined, there is a further disadvantage that the primary and secondary turbosuperchargers can not satisfy enough all desires in operation raised respectively in accordance with octane numbers of fuel supplied to the combustion chamber in the engine.

In more detail, when only the primary turbosupercharger is caused to work with a favorable response in supercharging, resistance against exhaust gas in an exhaust passage of the engine is increased so that a relatively large exhaust pressure is produced and therefore the engine is apt to be subjected to knocking. On the other hand, when both the primary and secondary turbosuperchargers are caused to work simultaneously, the resistance against exhaust gas in the exhaust passage is reduced and therefore the engine is advantaged in respect of knocking.

The knocking occurring on the engine is directly affected by the octane number of fuel supplied to the combustion chamber of the engine, and accordingly each of the primary and secondary turbosuperchargers is desired to work selectively in P and S operating areas which are determined variably in accordance with the octane number of fuel supplied to the combustion chamber of the engine. However, in the case where the P and S operating areas are fixedly predetermined, the primary and secondary turbosuperchargers can not satisfy the desire thereto.

Further, the engine which is provided with the primary and secondary turbosuperchargers and for which the P and S operating areas are fixedly predetermined, is apt to cause torque shock therein when the secondary turbosupercharger starts working in a situation where the primary turbosupercharger has worked, and the torque shock thus caused is ready to be large especially in the case where the engine is accelerated.

In more detail, when the engine is accelerated in an operating state of the P operating area in which only the primary turbosupercharger has worked, an accelerator is actuated suddenly on a large scale so that the operating state of the engine moves rapidly into the S operating area in which the primary and secondary turbosuperchargers are to work simultaneously. However, since a certain acting time is necessitated to cause the secondary turbosupercharger to start operating, such a situation that only the primary turbosupercharger works though the operating state of the engine has moved into the S operating area is temporarily brought about and therefore torque produced by the engine is reduced to be considerably small due to increased exhaust pressure in an exhaust passage extending from the engine. After that, the secondary turbosupercharger is started working to cause the engine to produce increased torque so that the torque produced by the engine is varied steeply and this results in the large torque shock caused when the engine is accelerated.

OBJECTS AND SUMMARY OF THE INVENTION

Accordingly, it is an object of the present invention to provide an air supply control system for an internal combustion engine provided with a plurality of turbosuperchargers operative to work selectively to vary their supercharging capacity in accordance with operating conditions of the engine, which avoids the foregoing disadvantages and problems encountered with the prior art.

Another object of the invention is to provide an air supply control system for an internal combustion engine provided with a plurality of turbosuperchargers operative to work selectively to vary their supercharging capacity in accordance with operating conditions of the engine, by which an exhaust gas discharged from the engine to be applied to an exhaust emission purifying catalyzer is made favorable for early activation of the exhaust emission purifying catalyzer.

A further object of the invention is to provide an air supply control system for an internal combustion engine provided with a plurality of turbosuperchargers operative to work selectively to vary their supercharging capacity in accordance with operating conditions of the engine, by which the turbosuperchargers are caused to meet appropriately each of desires in operation raised respectively in accordance with speed ranges taken selectively in a transmission which is connected to the engine.

A further object of the invention is to provide an air supply control system for an internal combustion engine provided with a plurality of turbosuperchargers operative to work selectively to vary their supercharging capacity in accordance with operating conditions of the engine, by which the turbosuperchargers are caused to meet appropriately each of desires in operation raised respectively in accordance with octane numbers of fuel supplied to the engine.

A still further object of the invention is to provide an air supply control system for an internal combustion engine provided with a plurality of turbosuperchargers operative to work selectively to vary their supercharging capacity in accordance with operating conditions of the engine, by which torque shock is prevented from being brought about when at least one of the turbosuperchargers starts working for accelerating the engine under a condition where the rest of the turbosuperchargers has worked.

According to the present invention, there is provided an air supply control system for an internal combustion engine comprising at least first and second turbosuperchargers each composed of a turbine disposed in one of exhaust passages connected with the engine and a blower connected through a shaft with the turbine and disposed in one of intake passages connected with the engine, an exhaust cutoff valve operative selectively to be open and closed respectively for opening and closing the exhaust passage in which the turbine of the second turbosupercharger is disposed, an intake air cutoff valve operative selectively to be open and closed respectively for opening and closing the intake passages in which the blower of the second turbosupercharger is disposed, a cutoff valve controller operative to cause both the exhaust cutoff valve and the intake air cutoff valve to be closed when intake air mass flow fed to the engine is to be relatively small and to cause both the exhaust cutoff valve and the intake air cutoff valve to be open when intake air mass flow fed to the engine is to be relatively large, so that the first turbosupercharger works for supercharging the engine when the intake air mass flow fed to the engine is to be relatively small and both of the first and second turbosuperchargers work simultaneously for supercharging the engine when the intake air mass flow fed to the engine is to be relatively large, an engine operation detector for detecting operating conditions of the engine, and an operation controller operative to vary, in response to the operating condition detected by the engine operation detector, a boundary between first and second operating areas provided on an operating characteristic chart of the engine respectively for a first supercharging operation in which the first turbosupercharger works but the second turbosupercharger does not work and a second supercharging operation in which both of the first and second turbosuperchargers work simultaneously.

With the air supply control system thus constituted in accordance with the present invention, such disadvantages and problems as arising in the previously proposed engine which is provided with the primary and secondary turbosuperchargers and for which the P and S operating areas are fixedly predetermined, as described above, are eliminated from the internal combustion engine to which the air supply control system is applied.

In one embodiment of the air supply control system according to the present invention taken by way of example, the engine operation detector is arranged to detect a cold engine operating condition in which the engine operates with a relatively low temperature before having been warmed up sufficiently and the operation controller operates to vary the boundary between the first and second operating areas so as to narrow the second operating area when the cold engine operating condition is detected by the engine operation detector.

With such arrangements, an occasion of the second supercharging operation in which both of the first and second turbosuperchargers work simultaneously is reduced in the cold engine operation condition and therefore an exhaust gas which is discharged from the engine to be applied to an exhaust emission purifying catalyzer is increased in temperature speedily so as to be favorable for early activation of the exhaust emission purifying catalyzer.

In another embodiment of the air supply control system according to the present invention taken by way of example, the engine operation detector is arranged to detect speed ranges taken selectively in a transmission connected with the engine for detecting an engine operating condition in which the engine operates with a high speed range, such as the fourth or fifth speed range, taken in the transmission and the operation controller operates to vary the boundary between the first and second operating areas so as to extend the second operating area when the engine operating condition in which the engine operates with a high speed range is detected by the engine operation detector.

With such arrangements, an occasion of the second supercharging operation in which both of the first and second turbosuperchargers work simultaneously to have large supercharging capacity is increased in the engine operating condition in which the engine operates with a high speed range and this results in that the first and second turbosuperchargers are caused to meet appropriately each of desires in operation raised respectively in accordance with the speed ranges taken selectively in the transmission.

In a further embodiment of the air supply control system according to the present invention taken by way of example, the engine operation detector is arranged to detect octane numbers of fuel supplied to the engine for detecting an engine operating condition in which the engine operates with fuel having a relatively low octane number and therefore is apt to be subjected to knocking and the operation controller operates to vary the boundary between the first and second operating areas so as to extend the second operating area when the engine operating condition in which the engine operates with fuel having a relatively low octane number is detected by the engine operation detector.

With such arrangements, an occasion of the second supercharging operation in which both of the first and second turbosuperchargers work simultaneously to have large supercharging capacity is increased in the engine operating condition in which the engine operates with fuel having a relatively low octane number and this results in that the first and second turbosuperchargers are caused to meet appropriately each of desires in operation raised respectively in accordance with the octane numbers of fuel.

In a further embodiment of air supply control system according to the present invention taken by way of example, the engine operation detector is arranged to detect all of the above mentioned cold engine operating condition, engine operating condition in which the engine operates with a high speed range and engine operating condition in which the engine operates with fuel having a relatively low octane number to produce respective detection outputs, and the operation controller operates to vary the boundary between the first and second operating areas in response to the detection outputs of the engine operation detector.

In a still further embodiment of the air supply control system according to the present invention taken by way of example, the engine operation detector is arranged to detect an accelerating condition in which the engine is accelerated and the operation controller operates to vary the boundary between the first and second operating areas so as to extend the second operating area toward the first operating area with reduction of the first operating area when the accelerating condition is detected by the engine operation detector.

With such arrangements, the first supercharging operation in which the first turbosupercharger work but the second turbosupercharger does not work is limited to perform under a condition in which the intake air mass flow fed to the engine is sufficiently small when the engine is accelerated and this results in that a large torque shock is prevented from being brought about when the second turbosupercharger starts working for accelerating the engine under the condition in which the first turbosupercharger has worked.

The above, and other objects, features and advantages of the present invention will become apparent from the following detailed description which is to be read in conjunction with the accompanying drawings.

BRIEF DESCRIPTION OF THE DRAWINGS

FIGS. 13-a and 13-b show a flow chart used for explaining the operation of a fourth embodiment of air supply control system for an internal combustion engine according to the present invention;

FIGS. 19-a, 19-b and 19-c show a flow chart used for explaining the operation of the fifth embodiment.

DESCRIPTION OF THE PREFERRED EMBODIMENTS

Figure 1:
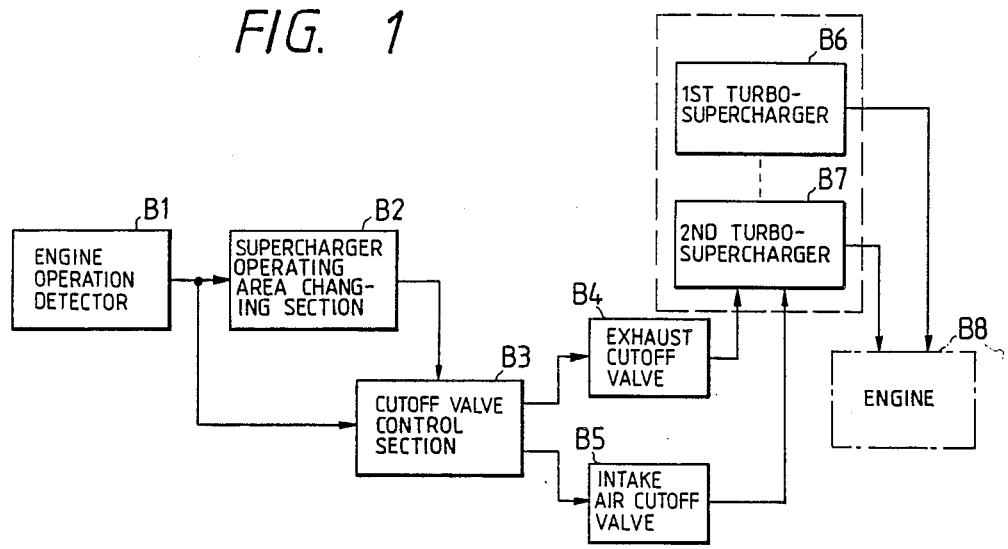
FIG. 1 is a block diagram illustrating the basic arrangement of an air supply control system for an internal combustion engine according to the present invention.

FIG. 1 illustrates a functional block diagram of a system incorporating the present invention. In the functional block diagram of FIG. 1, the system comprises an engine operation detector B1, a supercharger operating area changing section B2, a cutoff valve control section B3, an exhaust cutoff valve B4, an intake air cutoff valve B5, turbosuperchargers including a first turbosupercharger B6 and a second turbosupercharger B7, and the turbosuperchargers are connected with an engine B8 to which the system is applied.

Each of the first and second turbosuperchargers B6 and B7 has a turbine disposed in one of exhaust passages of the engine B8 and a blower connected with the turbine and disposed in one of intake passages of the engine B8. The exhaust cutoff valve B4 is operative selectively to be open and closed respectively for opening and closing the exhaust passage in which the turbine of the second turbosupercharger B7 is disposed, and the intake air cutoff valve B5 is operative selectively to be open and closed respectively for opening and closing the intake passage in which the blower of the second turbosupercharger B7 is disposed. The engine operation detector B1 detects operating conditions of the engine B8, and the cutoff valve control section B3 is operative to cause both the exhaust cutoff valve B4 and the intake air cutoff valve B5 to be closed when the operating condition detected by the engine operation detector B1 indicates that intake air mass flow fed to the engine B8 is to be relatively small and to cause both the exhaust cutoff valve B4 and the intake air cutoff valve B5 to be open when the operating condition detected by the engine operation detector B1 indicates that the intake air mass flow fed to the engine B8 is to be relatively large, so that the first turbosupercharger B6 works for supercharging the engine B8 when the intake air mass flow fed to the engine B8 is to be relatively small and both of the first and second turbosuperchargers B6 and B7 work for supercharging the engine B8 when the intake air mass flow fed to the engine B8 is to be relatively large. The supercharger operating area changing section B2 is operative to control the cutoff valve control section B3 in response to the operating condition detected by the engine operation detector B1 so as to cause both the exhaust cutoff valve B4 and the intake air cutoff valve B5 to be closed and open selectively for varying a boundary between first and second operating areas provided on an operating characteristic chart of the engine B8 respectively for a first supercharging operation in which the first turbosupercharger B6 works but the second turbosupercharger B7 does not work and a second supercharging operation in which both of the first and second turbosuperchargers B6 and B7 work.

Figure 2:
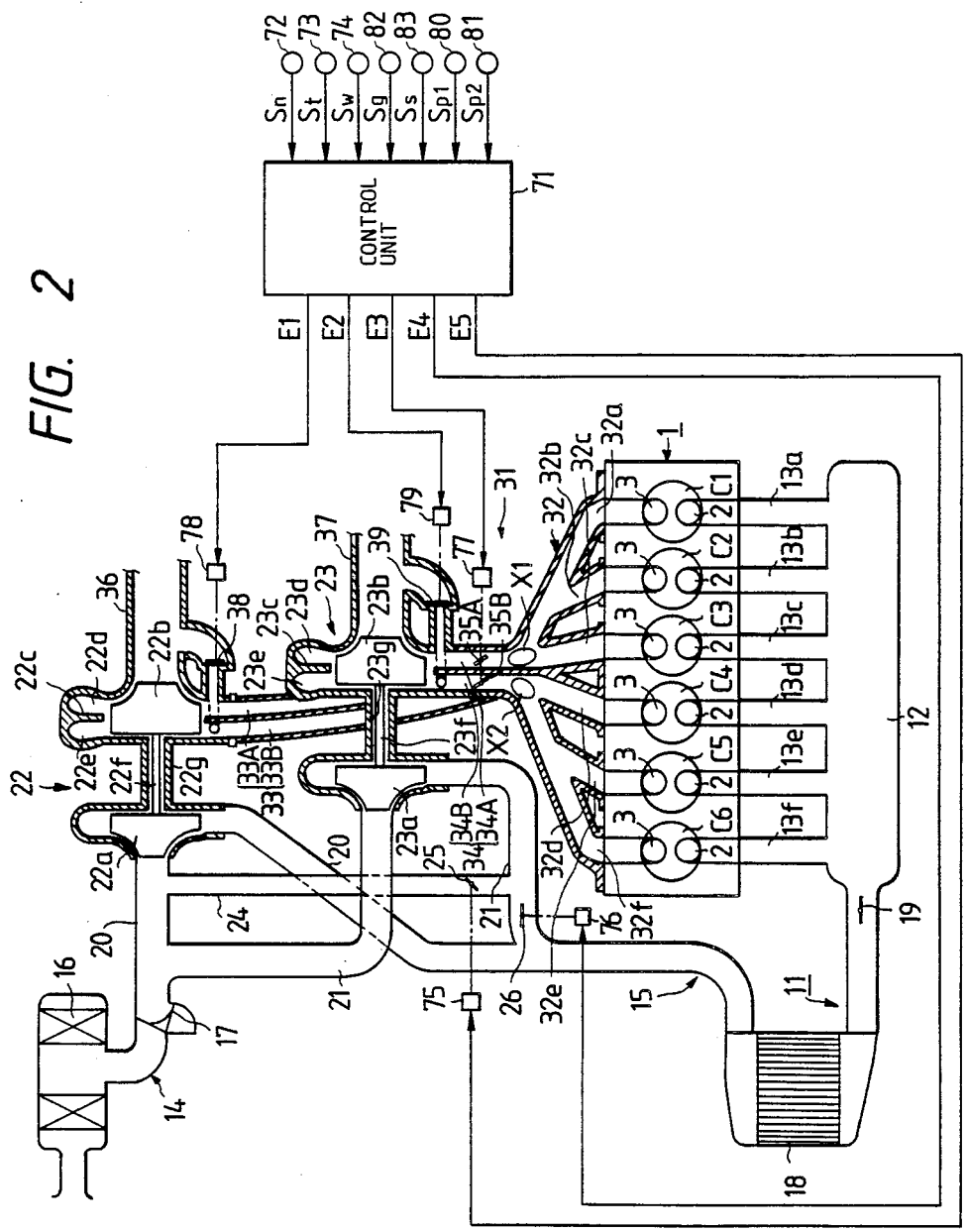
FIG. 2 is a schematic illustration showing a first embodiment of air supply control system for an internal combustion engine according to the present invention, together with essential parts of an engine to which the embodiment is applied.

FIG. 2 illustrates a first embodiment of air supply control system according to the present invention, together with a part of an engine to which the first embodiment is applied.

Referring to FIG. 2, an internal combustion engine 1, with which a transmission operative to take selectively a plurality of speed ranges therein is connected, is provided with six aligned cylinders C1 to C6, in each of which a combustion chamber is formed. Each of the cylinders C1 to C6 is provided with an inlet port 2 which is controlled to be open and closed by an inlet valve and an exhaust port 3 which is controlled to be open and closed by an exhaust valve. The six cylinders C1 to C6 take their respective exhaust strokes in such an order as cylinder C1→ cylinder C5→ cylinder C3→ cylinder C6→ cylinder C2→ cylinder C4, so that the cylinders C1 to C3 constitute a first group of cylinders operative to work with their respective exhaust strokes which are not successive to one another and the cylinders C4 to C6 constitute a second group of cylinders operative to work with their respective exhaust strokes which are not successive to one another.

An intake passage 11 for supplying the inlet ports 2 with intake air is provided with a surge chamber 12 to which the inlet ports 2 are connected through independent suction passages 13a to 13f, respectively. The intake passage 11 includes further a common upstream intake passage 14 provided with an air cleaner 16 and an air flow meter 17 and a common downstream intake passage 15 provided with an intercooler 18 and a throttle valve 19. The common upstream intake passage 14 and the common downstream intake passage 15 are interconnected through first and second branched intake passages 20 and 21. The first branched intake passage 20 is provided with a portion formed with a part of a housing of a first turbosupercharger 22, in which a blower 22a of the first turbosupercharger 22 is disposed and similarly the second branched intake passage 21 is provided with a portion formed with a part of a housing of a second turbosupercharger 23, in which a blower 23a of the second turbosupercharger 23 is disposed. A portion of the first branched intake passage 20 positioned to be upstream to the blower 22a and a portion of the second branched intake passage 21 positioned to be downstream to the blower 23a are interconnected through a bypass passage 24 which is provided therein with a bypass valve 25. An intake air cutoff valve 26 is disposed in a downstream end portion of the second branched intake passage 21.

An exhaust passage 31 for discharging exhaust gas from the exhaust ports 3 is provided with an exhaust manifold 32 forming separated partial exhaust passages 32a to 32f connected with the exhaust ports 3 respectively, a first junction X1 at which the separated partial exhaust passages 32a to 32c connected respectively with the exhaust ports 3 of the cylinders C1 to C3 constituting the first group of cylinders operative to work with their respective strokes which are not successive to one another are merged, and a second junction X2 ar which the separated partial exhaust passages 32d to 32f connected respectively with the exhaust ports 3 of the cylinders C4 to C6 constituting the second group of cylinders operative to work with their respective exhaust strokes which are not successive to one another are merged.

Each of first and second branched exhaust passages 33 and 34 is connected with the first and second junctions X1 and X2. The first branched exhaust passage 33 is provided with a pair of guiding passages 33A and 33B and a portion formed with a part of the housing of the first turbosupercharger 22 in which a turbine 22b of the first turbosupercharger 22, which is connected with the blower 22a through a shaft 22f supported by a bearing portion 22g, is disposed and a pair of scroll passages 22d and 22e separated by a partition 22c are formed, so that the first junction X1 is coupled through the guiding passage 33A with scroll passage 22d and the second junction X2 is coupled through the guiding passage 33B with scroll passage 22e.

Similarly, the second branched exhaust passage 34 is provided with a pair of guiding passages 34A and 34B and a portion formed with a part of the housing of the second turbosupercharger 23 in which a turbine 23b of the second turbosupercharger 23, which is connected with the blower 23a through a shaft 23f supported by a bearing portion 23g, is disposed and a pair of scroll passages 23d and 23e separated by a partition 23c are formed, so that the first junction X1 is coupled through the guiding passage 34A with scroll passage 23d and the second junction X2 is coupled through the guiding passage 34B with scroll passage 23e. Exhaust cutoff valves 35A and 35B which are linked to be open and closed simultaneously are disposed in the guiding passages 34A and 34B, respectively.

The first branched exhaust passage 33 includes further a downstream portion 36 for discharging the exhaust gas having passed through the turbine 22b of the first turbosupercharger 22 and waste gate valves (WGVs) 38 are provided between the scroll passage 22d and the downstream portion 36 and between the scroll passage 22e and the downstream portion 36, respectively. (The waste gate valve 38 provided between the scroll passage 22e and the downstream portion 36 is not shown in FIG. 2.) Similarly, the second branched exhaust passage 34 includes further a downstream portion 37 for discharging the exhaust gas having passed through the turbine 23b of the second turbosupercharger 23 and waste gate valves (WGBs) 39 are provided between the scroll passage 23d and the downstream portion 37 and between the scroll passage 23e and the downstream portion 37, respectively. (The waste gate valve 39 provided between the scroll passage 23e and the downstream portion 37 is not shown in FIG. 2.)

Further, the downstream portion 36 of the first branched exhaust passage 33 and the downstream portion 37 of the second branched exhaust passage 34 are merged into each other to be coupled with an exhaust emission purifying catalyzer to which the exhaust gas having passed through the first and second branched exhaust passages 33 and 34 is applied though such an arrangement is not shown in FIG. 2.

The first turbosupercharger 22 is arranged to be relatively small in supercharging capacity and to have a superior response in supercharging. On the other hand, the second turbosupercharger 23 is arranged to be large in supercharging capacity with a response in supercharging inferior to that of the first turbosupercharger 22.

Figure 3:
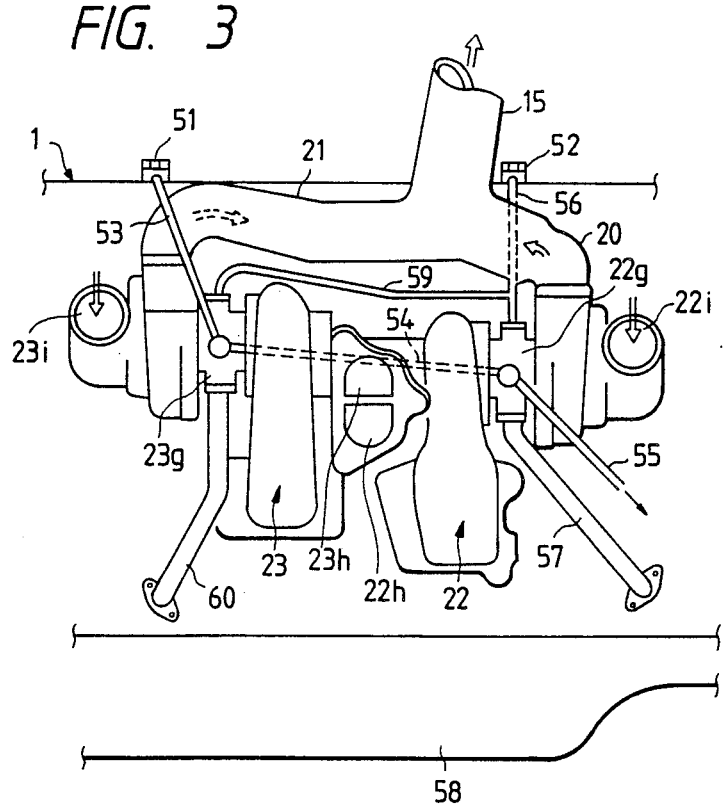
FIG. 3 is a schematic illustration showing a part of the first embodiment which includes a couple of turbosuperchargers.

An arrangement including a cooling water passage and an oil passage provided for the bearing portion 22g of the first turbosupercharger 22 and the bearing portion 23g of the second turbosupercharger 23 is shown in FIG. 3. Referring to FIG. 3, the cooling water passage includes a cooling water drain 51 provided on the engine 1 and pipes 53, 54 and 55. A cooling water derived from the cooling water drain 51 is supplied through the pipe 53 to the bearing portion 23g of the second turbosupercharger 23 having an air inlet port 23i and an air outlet port 23h and then supplied further through the pipe 54 to the bearing portion 22g of the first turbosupercharger 22 having an air inlet port 22i and an air outlet port 22h. The cooling water having passed through the bearing portions 22g and 23g successively returns through the pipe 55 to a water pump provided in the engine 1 (not shown in the drawings). The bearing portion 22g of the first turbosupercharger 22 which is cause to work almost always when the engine 1 is operating as described later and therefore apt to be subjected to high temperature is disposed to be lower than the bearing portion 23g of the second turbosupercharger 23. Accordingly, the bearing portion 22g is cooled down more efficiently than the bearing portion 23g when the cooling water which is boiling circulates in the cooling water passage after the engine 1 is stopped from operating.

The oil passage includes an oil drain 52 provided on the engine 1 and pipes 56, 57, 59 and 60. An oil derived from the oil drain 52 is supplied through the pipe 56 to the bearing portion 22g of the first turbosupercharger 22 to pass through the bearing portion 22g from top to bottom and then returns through the pipe 57 to an oil pan 58 provided in the engine 1. The oil derived from the oil drain 52 is also supplied through the pipes 56 and 59 to the bearing portion 23g of the second turbosupercharger 23 to pass through the bearing portion 23g from top to bottom and then returns through the pipe 60 to the oil pan 58.

Figure 4:
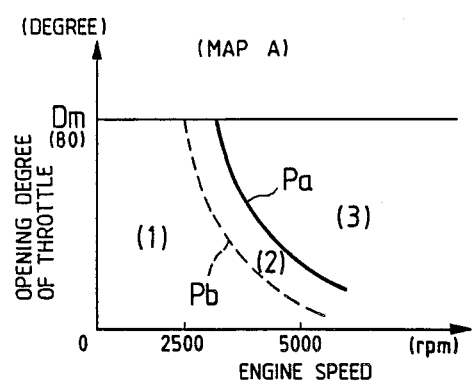
FIGS. 4, 5 and 6 are characteristic charts used for explaining the operation of the embodiment of air supply control system for an internal combustion engine according to the present invention.
Figure 5:
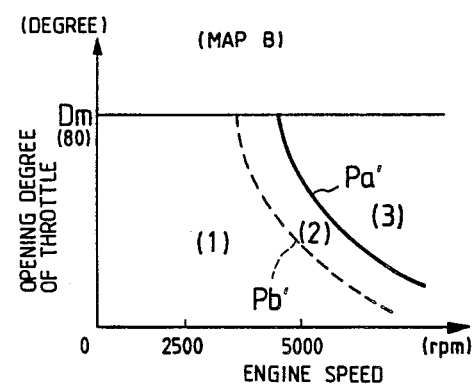

Referring back to FIG. 2, a control unit 71 constituted by a microcomputer is provided for controlling various valves disposed in the intake passage 11 and the exhaust passage 31. Detection output signals Sn, St, Sw, Sg, Ss, Sp1 and Sp2 obtained from an engine speed sensor 72 for detecting speed of the engine 1 (engine speed), a throttle sensor 73 for detecting opening degree of the throttle valve 19 (opening degree of throttle), a temperature sensor 74 for detecting cooling water temperature in the engine 1, a speed range sensor 82 for detecting speed ranges taken in the transmission connected with the engine 1, a knocking sensor 83 for detecting knocking occurring on the engine 1, an air pressure sensor 80 for detecting air pressure P1 at a portion downstream to the intake air cutoff valve 26 in the intake passage 11, and an air pressure sensor 81 for detecting air pressure P2 at a portion upstream to the intake air cutoff valve 26 in the intake passage 11, respectively, are supplied to the control unit 71. The control unit 71 is operative to produce control signals E1 to E5 selectively based on the detection output signals Sn, St, Sw, Sg, Ss, Sp1 and Sp2 and to supply an actuator 78 for driving the waste gate valves 38 with the control signal E1, an actuator 79 for driving the waste gate valves 39 with the control signal E2, an actuator 77 for driving the exhaust cutoff valves 35A and 35B with the control signal E3, an actuator 76 for driving the intake air cutoff valve 26 with the control signal E4, and an actuator 75 for driving the bypass valve 25 with the control signal E5, so as to control each of the bypass valve 25, intake air cut valve 26, exhaust cut valves 35A and 35B and the waste gate valves 38 and 39 in accordance with, for example, characteristic charts for the operating condition of the engine 1 shown in FIGS. 4 and 5. Each of the characteristic charts of FIGS. 4 and 5 shows supercharger operating areas on a coordinate plane defined by an axis of abscissa representing engine speed and an axis of ordinate representing engine load embodied by, for example, opening degree of throttle and stored in the form of data map in a memory contained in the control unit 71. The characteristic chart shown in FIG. 4 in which supercharger operating areas (1), (2) and (3) partitioned by boundary lines Pa and Pb are provided and the maximum opening degree of throttle is shown with Dm is stored as a map A in the memory contained in the control unit 71 and the characteristic chart shown in FIG. 5 in which supercharger operating areas (1), (2) and (3) partitioned by boundary lines Pa' and Pb' are provided and the maximum opening degree of throttle is shown with Dm is stored as a map B in the memory contained in the control unit 71 in the case of this embodiment. In each of the characteristic charts shown in FIGS. 4 and 5, each of the supercharger operating areas (1) and (2) is set to correspond to the operating condition of the engine 1 in which intake air mass flow fed to the combustion chambers formed in the cylinders C1 to C6 is to be relatively small and the supercharger operating area (3) is set to correspond to the operating condition of the engine 1 in which intake air mass flow fed to the combustion chambers formed in the cylinders C1 to C6 is to be relatively large.

In the case of a normal engine operating condition in which the engine 1 is operating with an appropriate temperature after having been warmed up sufficiently, the map A is used for controlling the bypass valve 25, intake air cutoff valve 26, exhaust cutoff valves 35A and 35B and waste gate valves 38 and 39. When the operating condition of the engine 1 resides in the supercharger operating area (3), the exhaust cutoff valves 35A and 35B are fully opened and therefore the turbine 22b of the first turbosupercharger 22 and the turbine 23b of the second turbosupercharger 23 are driven to rotate by the exhaust gas passing through the first and second branched exhaust passages 33 and 34 respectively so that both the first and second turbosuperchargers 22 and 23 are caused to work with large supercharging capacity. At this time, the bypass valve 25 is closed and the intake air cutoff valve 26 is opened. When the operating condition of the engine 1 resides in the supercharger operating area (1), the exhaust cutoff valves 35A and 35B are fully closed and therefore the turbine 22b of the first turbosupercharger 22 is driven to rotate by the exhaust gas passing through the first branched exhaust passage 33 but the turbine 23b of the second turbosupercharger 23 is not driven to rotate so that only the first turbosuperchargers 22 is caused to work with relatively small supercharging capacity. At this time, both the bypass valve 25 and the intake air cutoff valve 26 are closed. Further, when the operating condition of the engine 1 resides in the supercharger operating area (2) between the boundary lines Pa and Pb, the exhaust cutoff valves 35A and 35B are slightly opened and therefore the turbine 23b of the second turbosupercharger 23 is driven to rotate slowly by the exhaust gas passing through the second branched exhaust passage 34 so that only the second turbosupercharger 23 is caused to be in its idling state to be ready for working normally. At this time, the bypass valve 25 is opened and the intake air cutoff valve 26 is closed.

In the case of a cold engine operating condition in which the engine 1 is operating with a relatively low temperature before having been warmed up sufficiently, the map B is used, in place of the map A, for controlling the bypass valve 25, intake air cutoff valve 26, exhaust cutoff valves 35A and 35B and waste gate valves 38 and 39. This means that the boundary between the supercharger operating areas (2) and (3) is changed from the boundary line Pa shown in FIG. 4 to the boundary line Pa' shown in FIG. 5 and the boundary between the supercharger operating areas (1) and (2) is changed from the boundary line Pb shown in FIG. 4 to the boundary line Pb' shown in FIG. 5 so that the supercharger operating areas (2) and (3) are shifted to the side of increased engine speed. Accordingly, in the cold engine operating condition, the second turbosupercharger 23 starts working at engine speed higher than the engine speed at which the second turbosupercharger 23 starts working in the normal engine operating condition.

Figure 6:
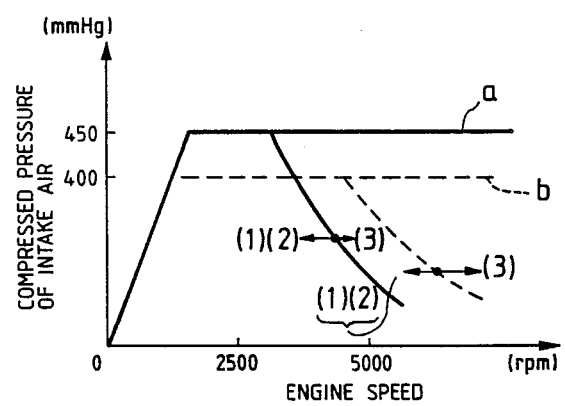

FIG. 6 shows an example of a supercharging characteristic in the normal engine operating condition, which is indicated by a solid line a, and an example of a supercharging characteristic in the cold engine operating condition, which is indicated by a broken line b, in the form of a graph with an axis of abscissa representing engine speed and an axis of ordinate representing compressed pressure of intake air. The maximum compressed pressure of intake air in the cold engine operating condition is set to be lower then the maximum compressed pressure of intake air in the normal engine operating condition in accordance with the supercharging characteristics indicated by the lines a and b, respectively. These characteristics are obtained with operations of the waste gate valves 38 and 39 performed in such a manner that the waste gate valves 38 are opened selectively by the actuator 78 to adjust the compressed pressure of intake air and the waste gate valves 39 are maintained to be closed when only the first turbosupercharger 22 works and the waste gate valves 38 are maintained to be closed and the waste gate valves 39 are opened selectively by the actuator 79 to adjust the compressed pressure of intake air when both of the first and second turbosuperchargers 22 and 23 work simultaneously.

Figure 7:
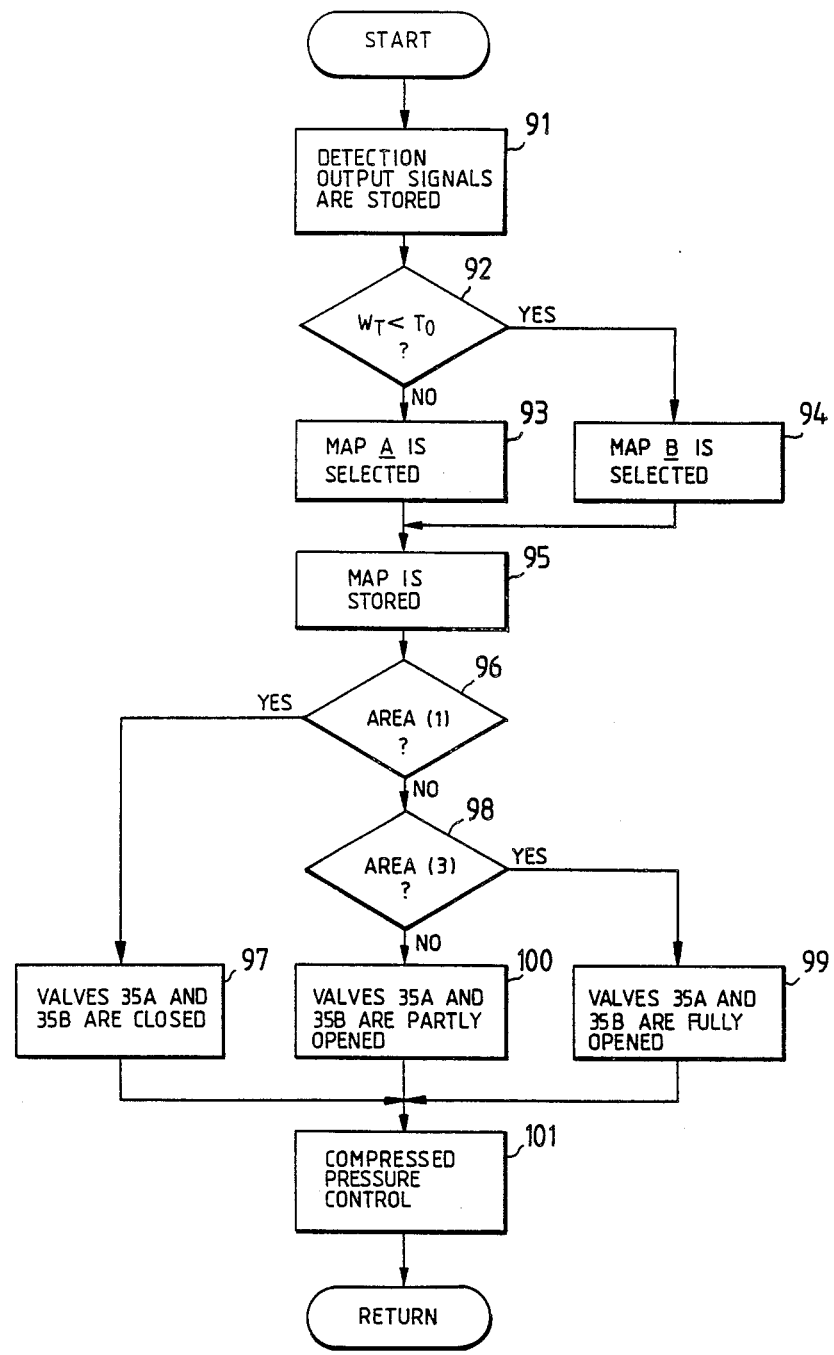
FIGS. 7 and 8 are flow charts used for explaining the operation of the first embodiment.
Figure 8:
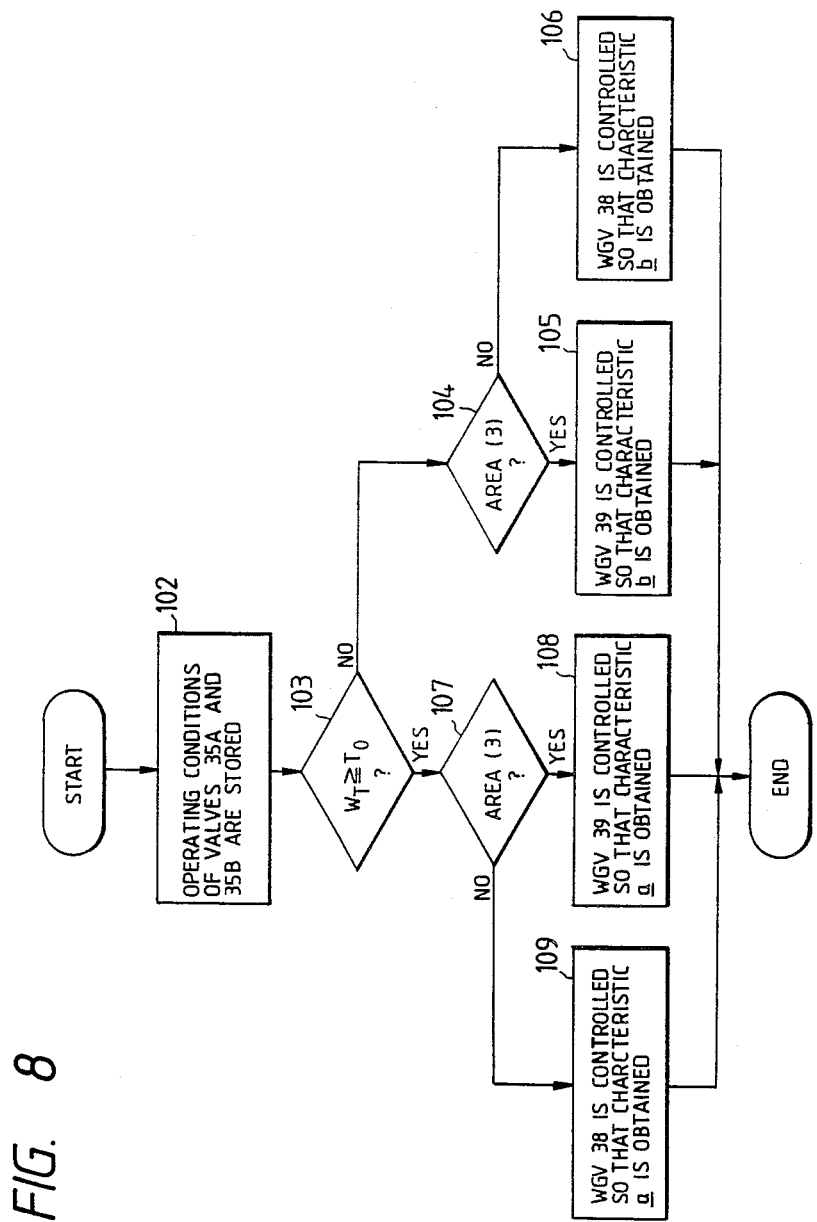

The above mentioned control of each of the bypass valve 25, intake air cutoff valve 26, exhaust cutoff valves 35A and 35B and waste gate valves 38 and 39 is conducted by the control unit 71, and an operation program for controlling these valves is carried out in the control unit 71 in accordance with flow charts shown in FIGS. 7 and 8.

According to the flow chart shown in FIG. 7, first, in process 91, the detection output signals Sn, St, Sw, Sp1 and Sp2 obtained from the sensors 72, 73, 74, 80 and 81 are stored. Then, in decision 92, it is checked, based on the detection output signal Sw representing cooling water temperature $W_T$, whether the cooling water temperature $W_T$ is lower than a predetermined temperature $T_O$ or not. When the cooling water temperature $W_T$ is equal to or higher than the predetermined temperature $T_O$, the map A corresponding to the characteristic chart shown in FIG. 4 is selected in process 93 and stored in process 95. On the other hand, when the cooling water temperature $W_T$ is lower than the predetermined temperature $T_O$, the map B corresponding to the characteristic chart shown in FIG. 5 is selected in process 94 and stored in process 95.

After that, it is checked in decision 96 whether the operating condition of the engine 1 resides in the supercharger operating area (1) or not, based on the detection output signal Sn representing the engine speed and the detection output signal St representing the opening degree of throttle. If the operating condition of the engine 1 resides in the supercharger operating area (1), the control signal E3 is supplied to the actuator 77 in such a manner that the exhaust cutoff valves 35A and 35B are closed and the control signals E4 and E5 are also supplied to the actuators 76 and 75 respectively in such a manner that both the intake air cutoff valve 26 and the bypass valve 25 are closed, in process 97, and then the step is advanced to process 101.

When it is clarified that the operating condition of the engine 1 does not reside in the supercharger operating area (1), it is further checked whether the operating condition of the engine 1 resides in the supercharger operating area (3) or not, in decision 98. If the operating condition of the engine 1 resides in the supercharger operating area (3), the control signal E3 is supplied to the actuator 77 in such a manner that the exhaust cutoff valves 35A and 35B ]re fully opened and the control signals E4 and E5 are also supplied to the actuators 76 and 75 respectively in such a manner that the intake air cutoff valve 26 is opened and the bypass valve 25 is closed, in process 99, and then the step is advanced to the process 101. To the contrary, if the operating condition of the engine 1 does not reside in the supercharger operating area (3), the control signal E3 is supplied to the actuator 77 in such a manner that the exhaust cutoff valves 35A and 35B are partly opened and the control signals E4 and E5 are also supplied to the actuators 76 and 75 respectively in such a manner that the intake air cutoff valve 26 is closed and the bypass valve 25 is opened, in process 100, and then the step is advanced to the process 101.

In the process 101, a compressed pressure control for adjusting the compressed pressure of intake air is performed in accordance with the flow chart shown in FIG. 8, and then the step is returned to process 91.

According to the flow chart shown in FIG. 8, first, in process 102, the operating conditions of the exhaust cutoff valves 35A and 35B are stored. Then, in decision 103, it is checked whether the cooling water temperature $W_T$ is equal to or higher than the predetermined temperature $T_O$ or not. When the cooling water temperature $W_T$ is lower than the predetermined temperature $T_O$, it is checked whether the operating condition of the engine 1 resides in the supercharger operating area (3) or not, based on the operating conditions of the exhaust cutoff valves 35A and 35B stored in the process 102, in decision 104. If the operating condition of the engine 1 resides in the supercharger operating area (3), the control signal E2 is supplied to the actuator 79 whereby each of the waste gate valves 39 is controlled so that the supercharging characteristic indicated by the broken line b in FIG. 6 is obtained, in process 105, and then the control is terminated. To the contrary, the operating condition of the engine 1 does not reside in the supercharger operating area (3), the control signal E1 is supplied to the actuator 78 whereby each of the waste gate valves 38 is controlled so that the supercharging characteristic indicated by the broken line b in FIG. 6 is obtained, in process 106, and then the control is terminated.

On the other hand, it is clarified in the decision 103 that the cooling water temperature $W_T$ is equal to or higher than the predetermined temperature $T_O$, it is checked whether the operating condition of the engine 1 resides in the supercharger operating area (3) or not, in decision 107. If the operating condition of the engine 1 resides in the supercharger operating area (3), the control signal E2 is supplied to the actuator 79 whereby each of the waste gate valves 39 is controlled so that the supercharging characteristic indicated by the solid line a in FIG. 6 is obtained, in process 108, and then the control is terminated. To the contrary, the operating condition of the engine 1 does not reside in the supercharger operating area (3), the control signal E1 is supplied to the actuator 78 whereby each of the waste gate valves 38 is controlled so that the supercharging characteristic indicated by the solid line a in FIG. 6 is obtained, in process 109, and then the control is terminated.

In the first embodiment described above, the supercharger operating area (3) set in the characteristic chart for the operating condition of the engine 1 to correspond to a supercharging operation in which both of the first and second turbosupercharger 22 and 23 work simultaneously is narrowed in the cold engine operation condition and therefore the exhaust gas passing through the exhaust passage 31 to be applied to the exhaust emission purifying catalyzer is increased in temperature speedily so as to be favorable for early activation of the exhaust emission purifying catalyzer when the engine 1 operates with the relatively low temperature before having been warmed up sufficiently.

In a second embodiment of air supply control system according to the present invention which has also such a structural arrangement as shown in FIG. 2, the map B corresponding to the characteristic chart shown in FIG. 5 is used for controlling bypass valve 25, intake air cutoff valve 26, exhaust cutoff valves 35A and 35B and waste gate valves 38 and 39 in the case of a low speed range operating condition in which an engine 1 operates with a low speed range, such as the first, second or third speed, taken in a transmission connected with the engine 1, and the map A corresponding to the characteristic chart shown in FIG. 4 is used, in place of the map B, for controlling the bypass valve 25, intake air cutoff valve 26, exhaust cutoff valves 35A and 35B and waste gate valves 38 and 39 in the case of a high speed range operating condition in which the engine 1 operates with a high speed range, such as the fourth or fifth speed, taken in the transmission connected with the engine 1. Accordingly, in the high speed range operating condition, the boundary between the supercharger operating areas (2) and (3) is changed from the boundary line Pa' shown in FIG. 5 to the boundary line Pa shown in FIG. 4 and the boundary between the supercharger operating areas (1) and (2) is changed from the boundary line Pb' shown in FIG. 5 to the boundary line Pb shown in FIG. 4 so that the supercharger operating area (3) is extended toward the supercharger operating areas (2) and (1) with reduction of the supercharger operating area (1), and consequently a second turbosupercharger 23 starts working at engine speed lower than the engine speed at which the second turbosupercharger 23 starts working in the low speed range operating condition.

Figure 9:
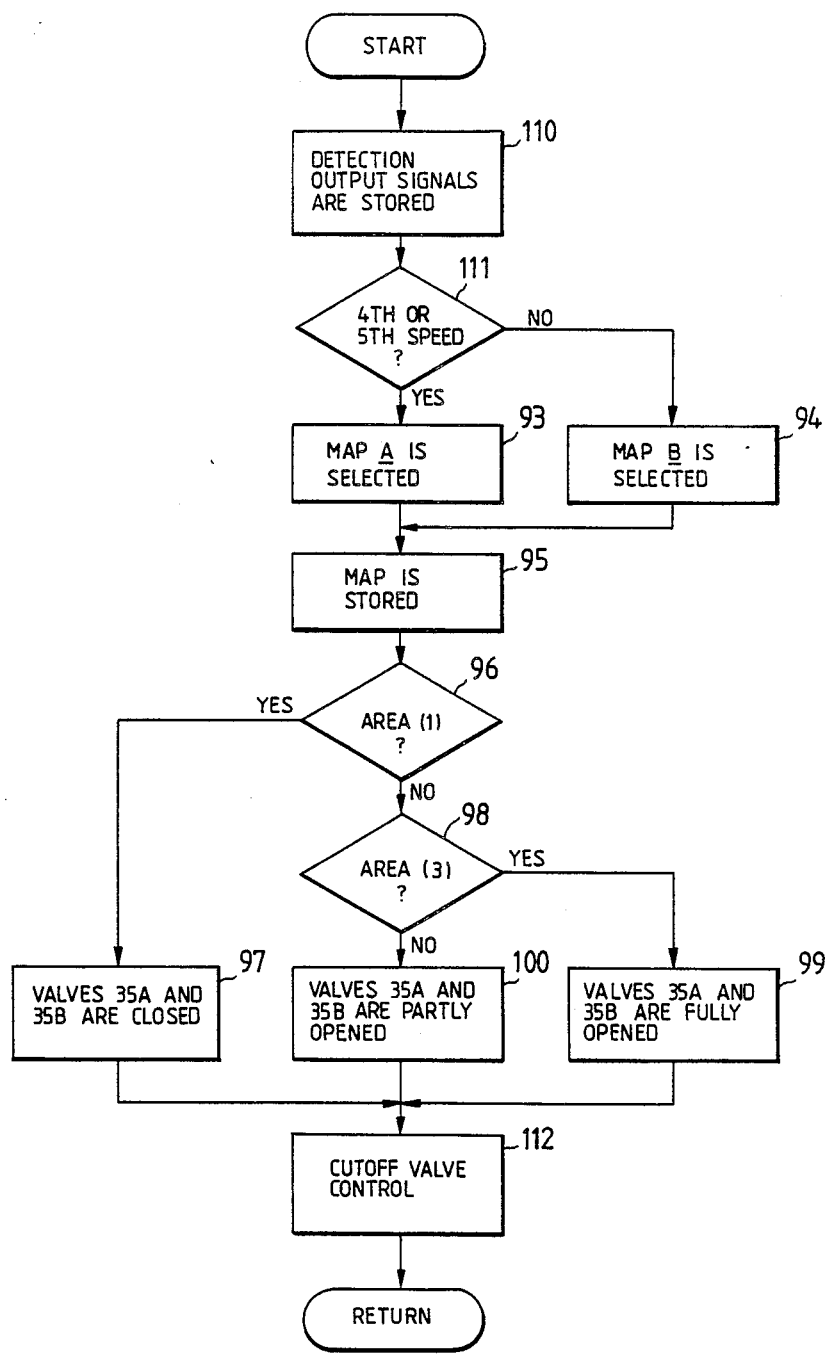
FIGS. 9 and 10 are flow charts used for explaining the operation of a second embodiment of air supply control system for an internal combustion engine according to the present invention.
Figure 10:
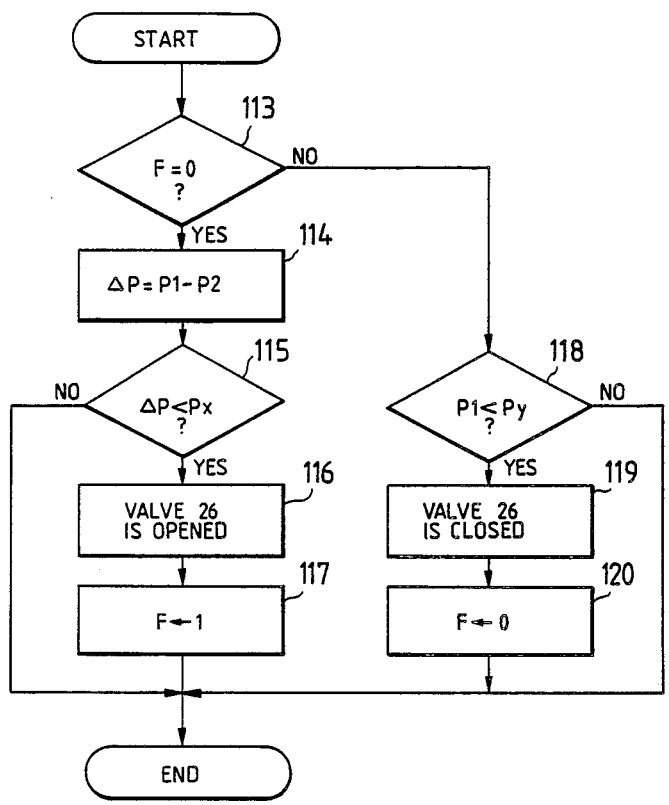

The bypass valve 25, intake air cutoff valve 26, exhaust cutoff valves 35A and 35B and waste gate valves 38 and 39 in the second embodiment are also controlled by a control unit 71 with reference to the map A or B similarly to those in the aforementioned first embodiment, and an operation program for controlling these valves is carried out in the control unit 71 in accordance with flow charts shown in FIGS. 9 and 10. In the flow chart shown in FIG. 9, processes and decisions corresponding to those in the flow chart shown in FIG. 7 are marked with the same references and further description thereof will be omitted.

According to the flow chart shown in FIG. 9, first, in process 110, detection output signals Sn, St, Sg, Sp1 and Sp2 obtained from sensors 72, 73, 75, 80 and 81 are stored. Then, in decision 111, it is checked, based on the detection output signal Sg representing a speed range taken in the transmission, whether the speed range taken in the transmission is the fourth or fifth speed or not. When the speed range is the fourth or fifth speed, the map A is selected in process 93 and stored in process 95. On the other hand, when the speed range is not the fourth or fifth speed, the map B is selected in process 94 and stored in process 95. Then, decision 96 to process 100 are carried out in the same manner as those in the flow chart shown in FIG. 7 with the exception that a control signal E4 is not supplied to an actuator 76 for controlling the intake air cutoff valve 26 in any one of the processes 97, 99 and 100.

After that, in process 112 subsequent to the process 97, 99 or 100, a cutoff valve control for causing the intake air cutoff valve 26 to be open and closed selectively is performed in accordance with the flow chart shown in FIG. 10, and then the step is returned to process 110.

According to the flow chart shown in FIG. 10, first, in decision 113, it is checked whether a flag F, which indicates the closed condition of the intake air cutoff valve 26 with 0, is 0 or not. If the flag F is 0, an air pressure difference ΔP between an air pressure P1 at a portion downstream to the intake air cutoff valve 26 in an intake passage 11 and an air pressure P2 at a portion upstream to the intake air cutoff valve 26 in the intake passage 11 is calculated based on the detection output signal Sp1 representing the air pressure P1 and the detection output signal Sp2 representing the air pressure P2, in process 114.

Then, it is checked whether the air pressure difference ΔP is smaller than a predetermined pressure value Px or not, in decision 115. If the air pressure difference ΔP is equal to or larger than the predetermined pressure value Px, the control is terminated because the air pressure P2 has not been increased enough. To the contrary, if the air pressure difference ΔP is smaller than the predetermined pressure value Px, that is, the air pressure P2 has been increased enough, the control signal E4 is supplied to the actuator 76 so that the intake air cutoff valve 26 is opened, in process 116. After that, the flag F is set to be 1 in process 117 and then the control is terminated. On the other hand, it is clarified in the decision 113 that the flag F is not 0 but 1, it is checked whether the air pressure P1 is smaller than a predetermined pressure value Py or not, in decision 118. If the air pressure P1 is equal to or larger than the predetermined pressure value Py, the control is terminated because the influence of the supercharging by the second turbosupercharger 23 has still remained. To the contrary, if the air pressure P1 is smaller than the predetermined pressure value Py, the control signal E4 is supplied to the actuator 76 so that the intake air cutoff valve 26 is closed, in process 119. After that, the flag F is set to be 0 in process 120 and then the control is terminated.

In the second embodiment described above, the supercharger operating area (3) corresponding to a supercharging operation in which both of first and second turbosuperchargers 22 and 23 work simultaneously is extended toward the supercharger operating area (1) corresponding to a supercharging operation in which only the first turbosupercharger 22 works in the high speed range operating condition and therefore the first and second turbosuperchargers 22 and 23 are caused to meet appropriately each of desires in operation raised respectively in accordance with the speed ranges taken selectively in the transmission connected with the engine 1.

Further, in the second embodiment, the intake air cutoff valve 26 is subjected to the cutoff valve control carried out in accordance with the flow chart shown in FIG. 10 so at to be opened after the second turbosupercharger 23 has worked supercharging sufficiently when the exhaust cutoff valves 35A and 35B are fully opened.

Accordingly, the compressed pressure of intake air is prevented from being reduced temporarily due to time lag in the supercharging operation of the second turbosupercharger 23.

In a third embodiment of air supply control system according to the present invention which has also such a structural arrangement as shown in FIG. 2, the map B corresponding to the characteristic chart shown in FIG. 5 is used for controlling bypass valve 25, intake air cutoff valve 26, exhaust cutoff valves 35A and 35B and waste gate valves 38 and 39 in the case of a high octane number operating condition in which an engine 1 operates with fuel having a relatively high octane number and therefore is hard to be subjected to knocking and a spark retard value which is set for the engine 1 in response to the knocking is relatively small, and the map A corresponding to the characteristic chart shown in FIG. 4 is used, in place of the map B, for controlling the bypass valve 25, intake air cutoff valve 26, exhaust cutoff valves 35A and 35B and waste gate valves 38 and 39 in the case of a low octane number operating condition in which the engine 1 operates with fuel having a relatively low octane number and therefore is apt to be subjected to the knocking and the spark retard value set for the engine 1 is relatively large.

Accordingly, in the low octane number operating condition, the boundary between the supercharger operating areas (2) and (3) is changed from the boundary line Pa' shown in FIG. 5 to the boundary line Pa shown in FIG. 4 and the boundary between the supercharger operating areas (1) and (2) is changed from the boundary line Pb' shown in FIG. 5 to the boundary line Pb shown in FIG. 4 so that the supercharger operating area (3) is extended toward the supercharger operating areas (2) and (1) with reduction of the supercharger operating area (1), and consequently a second turbosupercharger 23 starts working at engine speed lower than the engine speed at which a second turbosupercharger 23 starts working in the high octane number operating condition.

Figure 11:
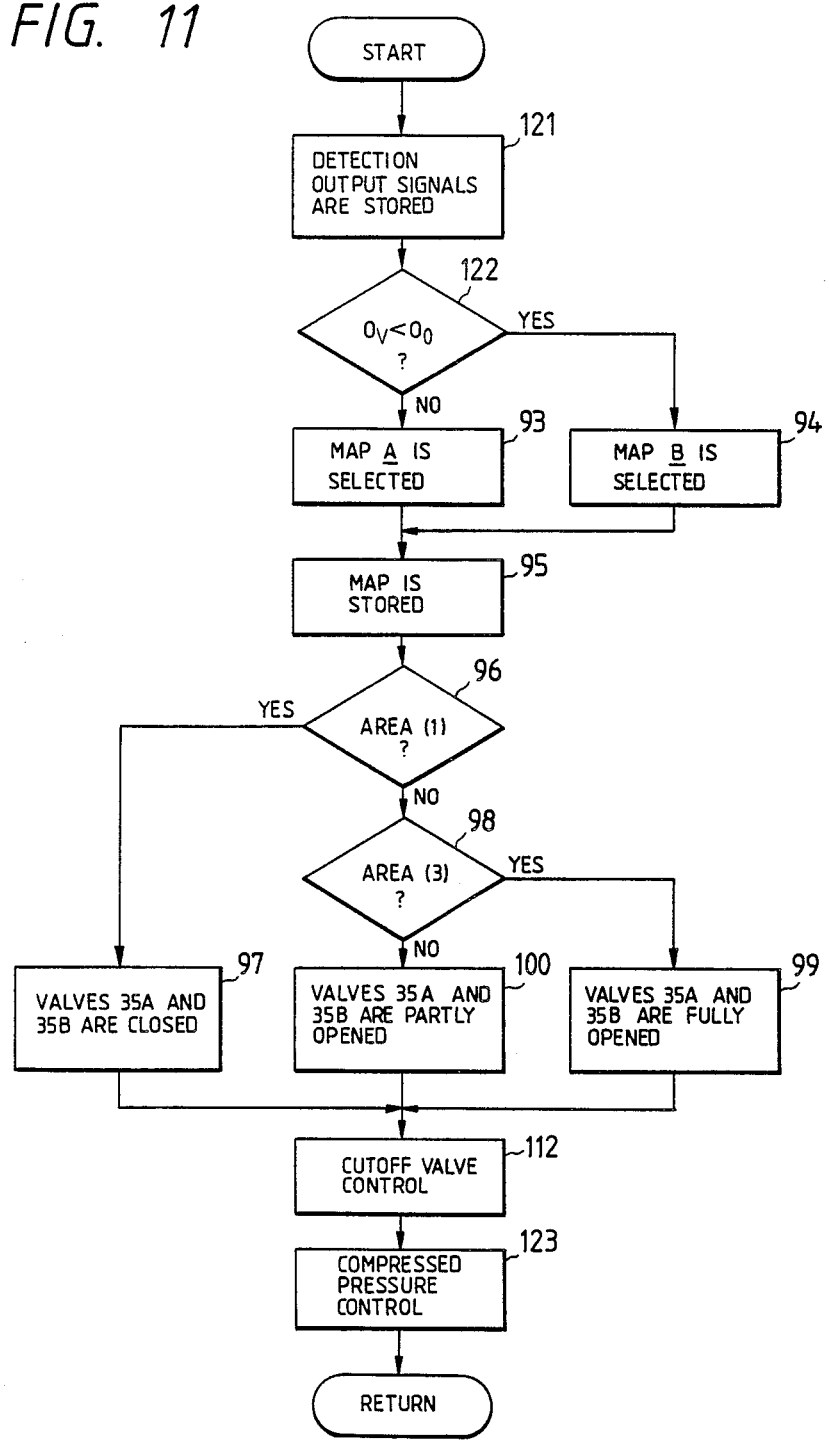
FIGS. 11 and 12 are flow charts used for explaining the operation of a third embodiment of air supply control system for an internal combustion engine according to the present invention.
Figure 12:
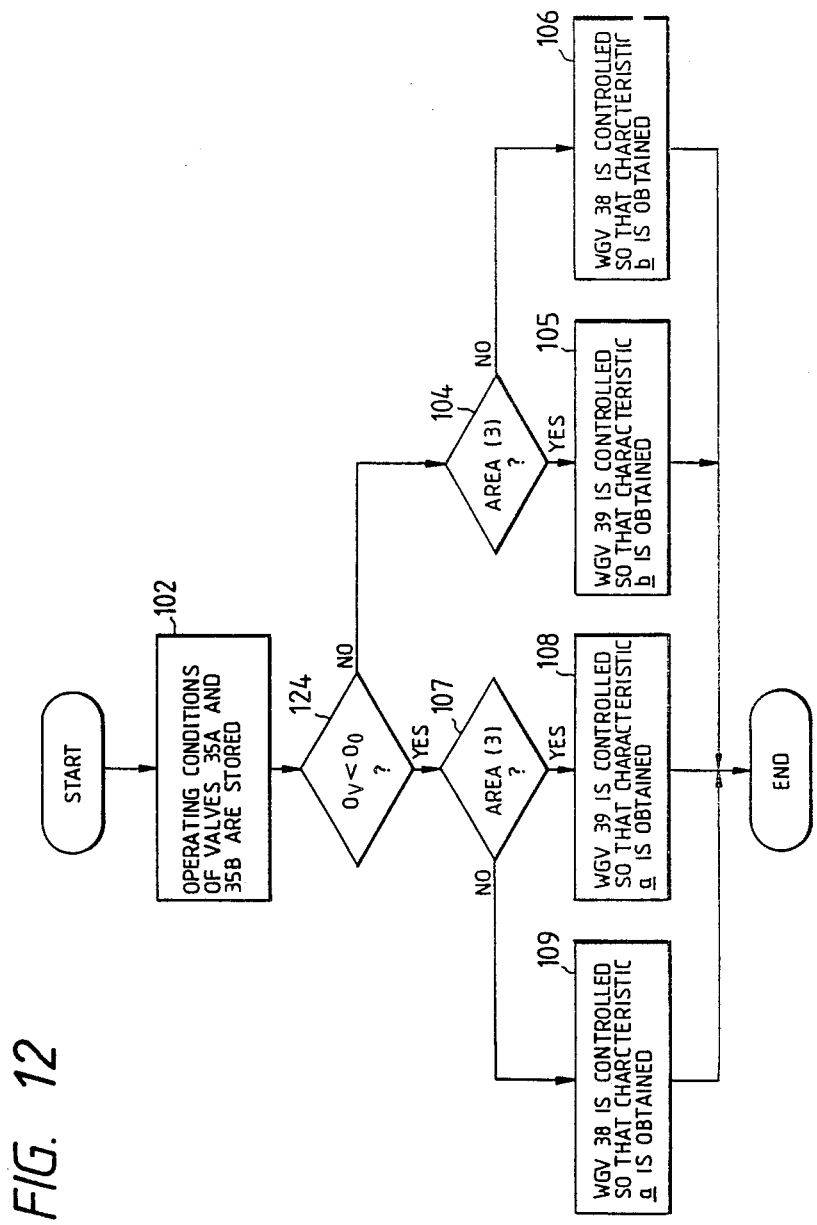

The bypass valve 25, intake air cutoff valve 26, exhaust cutoff valves 35A and 35B and waste gate valves 38 and 39 in the second embodiment are also controlled by a control unit 71 with reference to the map A or B similarly to those in the aforementioned first embodiment, and an operation program for controlling these valves is carried out in the control unit 71 in accordance with flow charts shown in FIGS. 11 and 12. In the flow chart shown in FIG. 11, processes and decisions corresponding to those in the flow chart shown in FIG. 9 are marked with the same references and further description thereof will be omitted. Further, in the flow chart shown in FIG. 12, processes and decisions corresponding to those in the flow chart shown in FIG. 8 are marked with the same references and further description thereof will be omitted.

According to the flow chart shown in FIG. 11, first, in process 121, detection output signals Sn, St, Ss, Sp1 and Sp2 obtained from sensors 72, 73, 76, 80 and 81 are stored. Then, in decision 122, it is checked, based on the detection output signal Ss representing the knocking occurring on the engine 1, whether a spark retard value Ov which is set in response to the knocking represented by the detection output signal Ss is smaller than a predetermined value Oo or not, that is, whether the octane number of fuel supplied to the engine 1 is relatively high or not. When the spark retard value Ov is equal to or larger than the predetermined value Oo, the map A is selected in process 93 and stored in process 95. On the other hand, when the spark retard value Ov is smaller than the predetermined value Oo, the map B is selected in process 94 and stored in process 95. Then, decision 96 to process 112 are carried out in the same manner as those in the flow chart shown in FIG. 9.

After that, in process 123 subsequent to the process 112, a compressed pressure control for adjusting the compressed pressure of intake air is performed in accordance with the flow chart shown in FIG. 12, and then the step is returned to process 121.

According to the flow chart shown in FIG. 12, after a process 102, it is checked whether the spark retard value Ov is smaller than the predetermined value Oo or not, in decision 124. When the spark retard value Ov is equal to or larger than the predetermined value Oo, the step is advanced to a decision 104, and when the spark retard value Ov is smaller than the predetermined value Oo, the step is advanced to a decision 107. The decision 104 and processes subsequent thereto and the decision 107 and processes subsequent thereto are carried out in the same manner as those in the flow chart shown in FIG. 8.

In the third embodiment described above, the supercharger operating area (3) corresponding to a supercharging operation in which both of first and second turbosuperchargers 22 and 23 work simultaneously is extended toward the supercharger operating area (1) corresponding to a supercharging operation in which only the first turbosupercharger 22 works in the low octane number operating condition and therefore the first and second turbosuperchargers 22 and 23 are caused to meet appropriately each of desires in operation raised respectively in accordance with the octane numbers of fuel supplied to the engine 1.

In a fourth embodiment of air supply control system according to the present invention which has also such a structural arrangement as shown in FIG. 2, the control of each of bypass valve 25, intake air cutoff valve 26, exhaust cutoff valves 35A and 35B and waste gate valves 38 and 39 is conducted by a control unit 71 in such a manner that the controls performed in the first to third embodiments respectively are combined, and an operation program for controlling these valves is carried out in the control unit 71 in accordance with flow charts shown in FIGS. 13-a and 13-b. In the flow chart shown in FIGS. 13-a and 13-b, processes and decisions corresponding to those in the flow chart shown in FIG. 11 are marked with the same references and further description thereof will be omitted.

According to the flow chart shown in FIGS. 13-a and 13-b, first, in process 131, detection output signals Sn, St, Sw, Sg, Ss, Sp1 and Sp2 obtained from sensors 72, 73, 74, 75, 76, 80 and 81 are stored. Then, in decision 132, it is checked, based on the detection output signal Sg representing a speed range taken in a transmission connected with an engine 1, whether the speed range taken in the transmission is the fourth or fifth speed or not. When the speed range is the fourth or fifth speed, it is checked, based on the detection output signal Sw representing cooling water temperature $W_T$, whether the cooling water temperature $W_T$ is lower than a predetermined temperature $T_O$ or not, in decision 133. When the cooling water temperature $W_T$ is equal to or higher than the predetermined temperature $T_O$, it is checked, based on the detection output signal Ss representing knocking occurring on the engine 1, whether a spark retard value Ov which is set in response to the knocking represented by the detection output signal Ss is smaller than a predetermined value Oo or not, that is, whether an octane number of fuel supplied to the engine 1 is relatively high or not, in decision 134. If the spark retard value Ov is equal to or larger than the predetermined value Oo, the map A is selected in process 135 and stored in process 95. On the other hand, when the spark retard value Ov is smaller than the predetermined value Oo, a map A' which corresponds to a modification of the characteristic chart shown in FIG. 4 is selected in process 136 and stored in the process 95.

If it is clarified in the decision 133 that the cooling water temperature $W_T$ is lower than the predetermined temperature $T_O$, it is checked whether the spark retard value Ov is smaller than the predetermined value Oo or not, in decision 137. If the spark retard value Ov is equal to or larger than the predetermined value Oo, the map A' is selected in the process 136 and stored in the process 95. On the other hand, when the spark retard value Ov is smaller than the predetermined value Oo, a map B' which corresponds to a modification of the characteristic chart shown in FIG. 5 is selected in process 138 and stored in the process 95.

Further, if it is clarified in the decision 132 that the speed range is not the fourth or fifth speed, it is checked whether the cooling water temperature $W_T$ is lower than the predetermined temperature $T_O$ or not, in decision 139. When the cooling water temperature $W_T$ is lower than the predetermined temperature $T_O$, it is checked whether the spark retard value Ov is smaller than the predetermined value Oo or not, in decision 140. If the spark retard value Ov is equal to or larger than the predetermined value Oo, the map A' is selected in the process 136 and stored in the process 95. On the other hand, when the spark retard value Ov is smaller than the predetermined value Oo, the map B' is selected in the process 138 and stored in the process 95.

Then, if it is clarified in the decision 139 that the cooling water temperature $W_T$ is equal to or higher than the predetermined temperature $T_O$, it is checked whether the spark retard value Ov is smaller than the predetermined value Oo or not, in decision 141. If the spark retard value Ov is equal to or larger than the predetermined value Oo, the map A' is selected in the process 138 and stored in the process 95. On the other hand, when the spark retard value Ov is smaller than the predetermined value Oo, the map B is selected in process 142 and stored in the process 95.

Each of the steps from the process 95 to process 123 are carried out in the same manner as those in the flow chart shown in 11, and there after, the step is returned to the process 131.

In the fourth embodiment, all of the advantages obtained in the first to third embodiments can be obtained comprehensively.

Figure 14:
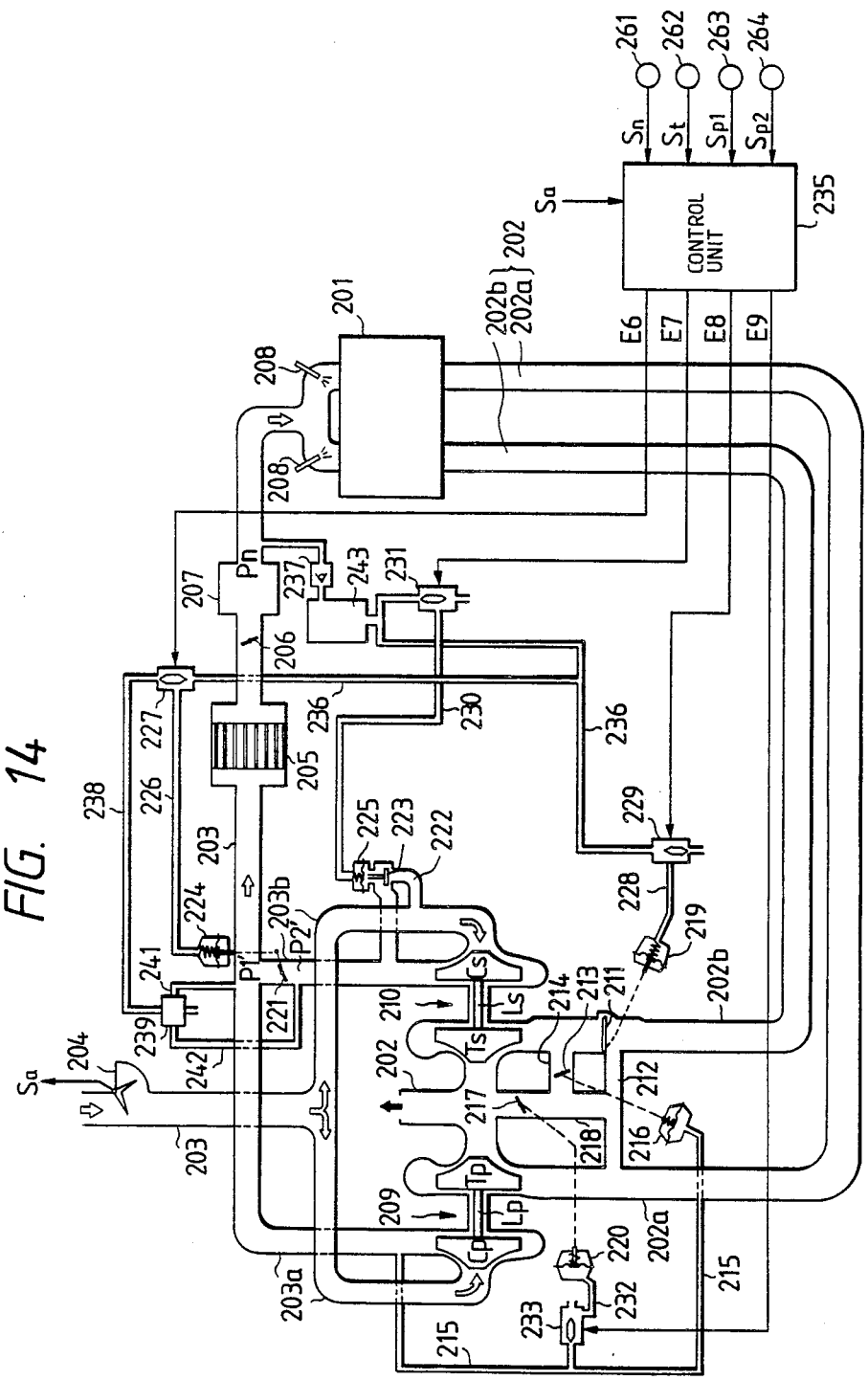
FIG. 14 is a schematic illustration showing a fifth embodiment of air supply control system for an internal combustion engine according to the present invention, together with essential parts of an engine to which the embodiment is applied.

FIG. 14 illustrates a fifth embodiment of air supply control system according to the present invention, together with a part of an engine to which the fifth embodiment is applied.

Referring to FIG. 14, an internal combustion engine 201, which is, for example, a rotary engine having a couple of rotors each forming an operating chamber having the capacity of, for example, 654 cubic centimeters and with which a transmission operative to take selectively a plurality of speed ranges therein is connected, is provided with an exhaust passage 202 for discharging exhaust gas from the engine 201 and an intake passage 203 for supplying the engine 201 with intake air. The exhaust passage 202 includes first and second separated exhaust passages 202a and 202b, and the intake passage 203 includes first and second branched intake passages 203a and 203b which are separated from each other at a location downstream to an air flow sensor 204 provided for detecting intake air mass flow in the intake passage 203 and merged into each other at a location upstream to an intercooler 205 provided for cooling the intake air in the intake passage 203. A portion of the intake passage 203 downstream to the intercooler 205 is provided with a throttle valve 206, a surge chamber 207 and a fuel injector 208.

A primary turbosupercharger 209 is provided with a turbine Tp disposed in the first separated exhaust passage 202a to be driven to rotate by the exhaust gas and a blower Cp disposed in the first branched intake passage 203a and coupled through a rotating shaft Lp with the turbine Tp. A secondary turbosupercharger 210 is also provided with a turbine Ts disposed in the second separated exhaust passage 202b to be driven to rotate by the exhaust gas and a blower Cs disposed in the second branched intake passage 203b and coupled through a rotating shaft Ls with the turbine Ts.

A portion of the first branched intake passage 203a upstream to the blower Cp and a portion of the second branched intake passage 203b upstream to the blower Cs are arranged in a line to form a branched portion, so that pressure waves produced in one of the first and second branched intake passages 203a and 203b are easy to propagate to the other of the first and second branched intake passages 203a and 203b but hard to propagate toward the air flow sensor 204.

An exhaust cutoff valve 211 is disposed in a portion of the second separated exhaust passage 202b upstream to the turbine Ts. This exhaust cutoff valve 211 is operative to close the second separated exhaust passage 202b in order to prevent the exhaust gas from being supplied to the turbine Ts so that only the primary turbosupercharger 209 works in a situation where intake air mass flow supplied to the engine 201 is relatively small.

A portion of the second separated exhaust passage 202b upstream to the exhaust cutoff valve 211 is connected through a connecting passage 212 with a portion of the first separated exhaust passage 202a upstream to the turbine Tp. The connecting passage 212 is also connected with a portion of the exhaust passage 202 downstream to the turbines Tp and Ts through a bypass passage 218 in which a waste gate valve 217 is provided. A portion of the bypass passage 218 upstream to the waste gate valve 217 is connected with a portion of the second separated exhaust passage 202b between the exhaust cutoff valve 211 and the turbine Ts through an exhaust bypass passage 214 in which an exhaust bypass valve 213 is provided.

The exhaust bypass valve 213 is driven by a diaphragm actuator 216 and a pressure chamber of the diaphragm actuator 216 is coupled through a control pressure pipe 215 with a portion of the first branched intake passage 203a downstream to the blower Cp. The exhaust bypass valve 213 is opened when an air pressure P1' at a portion downstream to the blower Cp in the first branched intake passage 203a is equal to or higher than a predetermined pressure value (for example, 500 mmHg) during a period of time in which the engine speed is increasing, so that the exhaust gas is supplied slightly to the turbine Ts through the exhaust bypass shifting passage 214 when the exhaust cutoff valve 211 is closed. This results in that the turbine Ts starts rotating previously before the exhaust cutoff valve 211 is opened so that the response in supercharging by the secondary turbosupercharger 210 is improved and torque shock is reduced when the exhaust cutoff valve 211 is opened. The exhaust cutoff valve 211 and the waste gate valve 217 are driven by diaphragm actuators 219 and 220, respectively.

An intake air cutoff valve 221 is disposed in a portion of the second branched intake passage 203b downstream to the blower Cs. The second branched intake passage 203b is provided also with a bypass passage 222 detouring the turbine Ts and having therein a relief valve 223. The intake air cutoff valve 221 is driven by a diaphragm actuator 224 in such a manner as described later, and the relief valve 223 is driven by a diaphragm actuator 225 so as to keep the bypass passage 222 open up to a time point immediately before both of the intake air cutoff valve 221 and the exhaust cutoff valve 211 are opened during a period of time in which the engine speed is increasing. With such an operation of the relief valve 223, the blower Cs is caused to be easy to rotate and an air pressure in a portion of the second branched intake passage 203b between the blower Cs and the intake air cutoff valve 221 is prevented from being increased by the rotation of the blower Cs to which the exhaust gas is supplied slightly through the exhaust bypass passage 214 when the exhaust cutoff valve 211 is closed.

A control pressure pipe 226 extending from the diaphragm actuator 224 for driving the intake air cutoff valve 221 is connected with an output port of a three-way solenoid valve 227, and a control pressure pipe 228 extending from the diaphragm actuator 219 for driving the exhaust cutoff valve 211 is connected with an output port of a three-way solenoid valve 229. Further, a control pressure pipe 230 extending from the diaphragm actuator 225 for driving the relief valve 223 is connected with an output port of a three-way solenoid valve 231, and a control pressure pipe 232 extending from the diaphragm actuator 220 for driving the waste gate valve 217 is connected with an output port of a three-way solenoid valve 233. The three-way solenoid valves 227, 229, 231 and 233 are controlled by a control unit 235 constituted by a microcomputer.

The control unit 235 is provided with detection output signals Sa, Sn, St, Sp1 and Sp2 obtained from the air flow sensor 204, an engine speed sensor 261 for detecting the engine speed, a throttle sensor 262 for detecting opening degree of the throttle valve 206 (opening degree of throttle), an air pressure sensor 263 for detecting the air pressure P1', and an air pressure sensor 264 for detecting an air pressure P2' at a portion upstream to the intake air cutoff valve 221 in the second branched intake passage 203b, respectively, and operative to produce control signals E6 to E9 selectively based on the detection output signals Sa, Sn, St, Sp1 and Sp2 and to supply the three-way solenoid valve 227 with the control signal E6, the three-way solenoid valve 231 with the control signal E7, the three-way solenoid valve 229 with the control signal E8, and the three-way solenoid valve 233 with the control signal E9.

One of input ports of the three-way solenoid valve 229 is open to the atmosphere and the other of the input ports is connected through a pipe 236 with a negative pressure tank 243 to which negative pressure Pn at a portion downstream to the throttle valve 206 in the intake passage 203 is supplied through a check valve 237. One of input ports of the three-way solenoid valve 227 is connected through the pipe 236 with the negative pressure tank 243 and the other of the input ports is connected through a pipe 238 with a pressure difference detecting valve 239.

Figure 15:
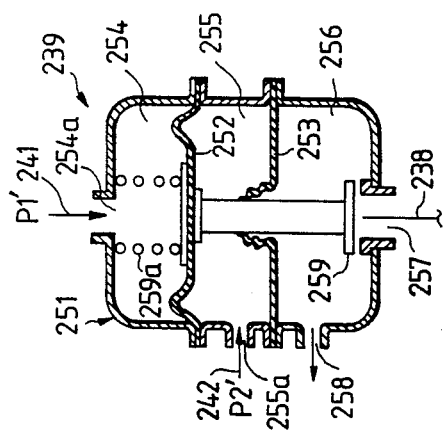
FIG. 15 is a schematic illustration showing a pressure difference detecting valve employed in the fifth embodiment.

As shown in FIG. 15, the pressure difference detecting valve 239 has a housing 251 in which three chambers 254, 255 and 256 are formed with diaphragms 252 and 253. The chambers 254 and 255 are provided with input ports 254a and 255a, respectively, and the chamber 256 is provided with an open port 258 and an output port 257 connected with the pipe 238. The input port 254a is connected through a pipe 241 with the portion of the first branched intake passage 203a downstream to the blower Cp so as to be supplied with the air pressure P1', and the input port 255a is connected through a pipe 242 with a portion of the second branched intake passage 203b upstream to the intake air cutoff valve 221 so as to be supplied with the air pressure P2'.

The pressure difference detecting valve 239 is provided further with a valve body 259 connected with the diaphragms 252 and 253 and biased by a spring 259a disposed in the chamber 254. This valve body 259 is operative to keep the output port 257 open so as to open the chamber 256 to the atmosphere when a pressure difference between the air pressures P1' and P2' is relatively large and keep the output port 257 closed when the pressure difference between the air pressures P1' and P2' is equal to or smaller than a predetermined pressure value $\Delta P'$. Accordingly, when the control pressure pipe 226 is communicated with the pipe 238 through the three-way solenoid valve 227 controlled by the control signal E6 and the pressure difference between the air pressures P1' and P2' is larger than the predetermined pressure value $\Delta P'$, the diaphragm actuator 224 is opened to the atmosphere and thereby the intake air cutoff valve 221 is opened. On the other hand, when the control pressure pipe 226 is communicated with the pipe 236 through the three-way solenoid valve 227 controlled by the control signal E6, the negative pressure is applied to the diaphragm actuator 224 and thereby the intake air cutoff valve 221 is closed.

When the control pressure pipe 228 is communicated with the pipe 236 through the three-way solenoid valve 229 controlled by the control signal E8, the negative pressure is applied to the diaphragm actuator 219 and thereby the exhaust cutoff valve 211 is closed, so that only the primary turbosupercharger 209 is caused to work. On the other hand, when the control pressure pipe 228 is opened to the atmosphere through the three-way solenoid valve 229 controlled by the control signal E8, the exhaust cutoff valve 211 is opened, so that the secondary turbosupercharger 210 is caused to work.

Figure 16:
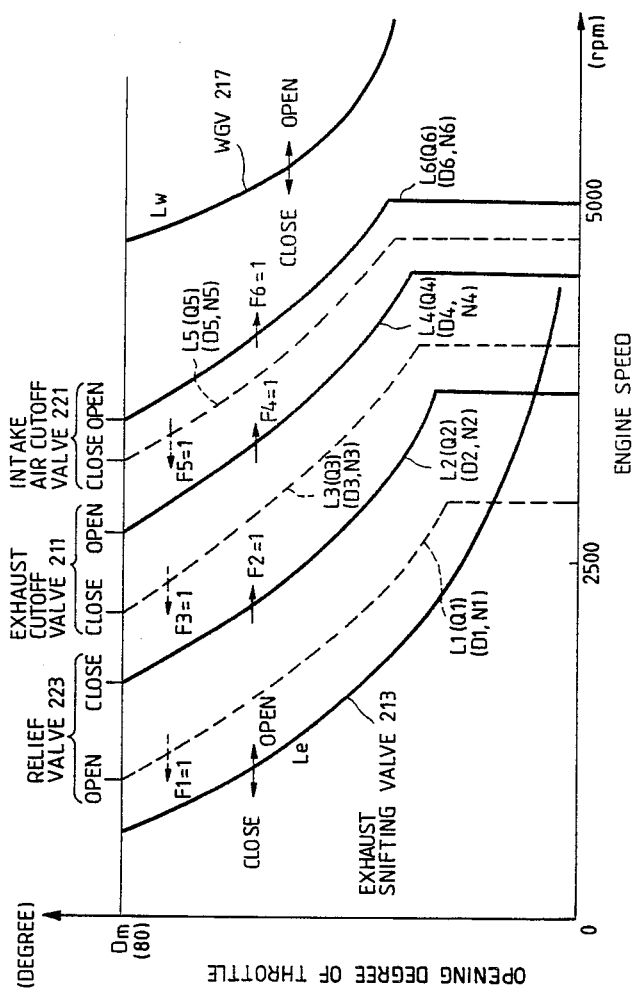
FIG. 16 is a characteristic chart used for explaining the operation of various valves employed in the fifth embodiment.

FIG. 16 is a characteristic chart showing the operating conditions of the exhaust cutoff valve 211, exhaust bypass valve 213, waste gate valve 217, intake air cutoff valve 221 and relief valve 223. This characteristic chart of FIG. 16 has an axis of abscissa representing engine speed and an axis of ordinate representing engine load embodied by, for example, opening degree of throttle, the maximum value of which is indicated by Dm, and is stored in the form of data map in a memory contained in the control unit 235.

According to the characteristic chart of FIG. 16, the waste gate valve 217 is changed to be open from close and to be close from open in accordance with a line Lw in common, and the exhaust shifting valve 213 is changed to be open from close and to be close from open in accordance with a line Le in common. On the other hand, the relief valve 223 is changed to be open from close in accordance with a line L1 and to be close from open in accordance with a line L2, the exhaust cutoff valve 211 is changed to be close from open in accordance with a line L3 and to be open from close in accordance with a line L4, and the intake air cutoff valve 221 is changed to be close from open in accordance with a line L5 and to be open from close in accordance with a line L6. The lines L1 to L6 indicate operating conditions of the engine 201 in which the engine 201 operates with intake air mass flow values Q1, Q2, Q3, Q4, Q5 and Q6, respectively.

The three-way solenoid valve 231 has its input ports, one of which is opened to the atmosphere and the other of which is connected with the negative pressure tank 243. In the case where the engine speed is relatively low, the negative pressure Pn is applied through the three-way solenoid valve 231 and the control pressure pipe 230 to the relief valve 223 and whereby the relief valve 223 keeps the bypass passage 222 open. Then, the three-way solenoid valve 231 is changed to open the control pressure pipe 230 to the atmosphere by the control signal E7 from the control unit 235, so that the relief valve 223 shuts the bypass passage 222, before the exhaust cutoff valve 211 and the intake air cutoff valve 221 are opened during the period of time in which the engine speed is increasing, as shown in FIG. 16.

The air pressure P1' is applied through the control pressure pipe 215 extending from the diaphragm actuator 216 to one of input ports of the three-way solenoid valve 233. When the engine speed and the opening degree of throttle are equal to or more than respective predetermined values and the air pressure P1' is equal to or higher than a predetermined pressure value, the three-way solenoid valve 233 is opened by the control signal E9 from the control unit 235 so as to apply the air pressure P1' to the diaphragm actuator 220 and thereby the diaphragm actuator 220 causes the waste gate valve 217 to make the bypass passage 218 open. The other of input ports of the three-way solenoid valve 233 is opened to the atmosphere and the waste gate valve 217 shuts the bypass passage 218 when the diaphragm actuator 220 is opened to the atmosphere through the three-way solenoid valve 233.

In the case where the engine 201 is accelerated, an operating area on the characteristic chart of FIG. 16 corresponding to an operating condition in which the primary and secondary turbosuperchargers 209 and 210 work simultaneously, which corresponds to an area having the line L6 as a lower boundary on the characteristic chart of FIG. 16, is extended toward areas of smaller opening degree of throttle and lower engine speed. Such an area having the line L6 as a lower boundary on the characteristic chart of FIG. 16 is set to correspond to an operating condition of the engine 201 in which the intake air mass flow fed to the engine 201 is to be relatively large and will be referred to as a two-charger operating area hereinafter, and the areas other than the two-charger operating area on the characteristic chart of FIG. 16 are set to correspond to an operating condition of the engine 201 in which the intake air mass flow fed to the engine 201 is to be relatively small.

Figure 17:
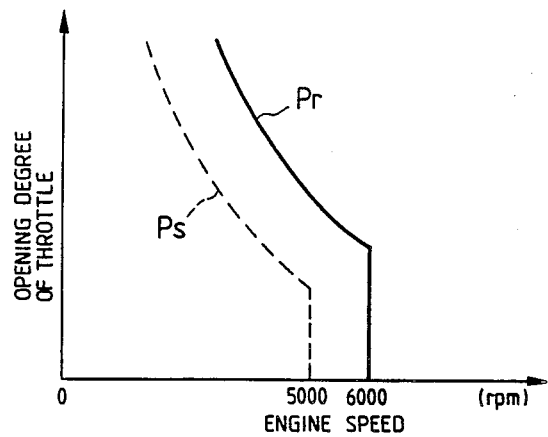
FIGS. 17 and 18 are characteristic charts used for explaining the operation of the fifth embodiment.

In more detail, when the operating condition of the engine 201 resides in the two-charger operating area partitioned by the line L6 on the characteristic chart of FIG. 16, the secondary turbosupercharger 210 is caused to work in addition to the primary turbosupercharger 209 which has been caused to work. The line L6 on the characteristic chart shown in FIG. 16, which forms the lower boundary of the two-charger operating area, is shown as a solid line Pr on a characteristic chart of FIG. 17, which has also an axis of abscissa representing engine speed and an axis of ordinate representing opening degree of throttle, under a condition in which the engine 201 is not accelerated. Then, when the engine 201 is accelerated, the solid line Pr is shifted to be a broken line Ps on the characteristic chart of FIG. 17. On the occasion of such shift from the solid line Pr to the broken line Ps, lines L1 to L5 on the characteristic chart of FIG. 16 are also shifted toward areas of smaller opening degree of throttle and lower engine speed.

In this embodiment, the acceleration of the engine 201 is detected based on a variation rate of intake air mass flow (dQ/dt), which becomes equal to or more than a predetermined value when the engine 201 is accelerated, for the shift of the boundary of the two-charger operating area.

The extension of the two-charger operating area, that is, the shift of the boundary of the two-charger operating area may be varied to increase in accordance with increment of the acceleration of the engine 201. Further, it may be provided such an arrangement that the shift of the boundary of the two-charger operating area under a condition in which the engine 201 operates with a low speed range taken in the transmission connected with the engine 201 is increased compared with that under a condition in which the engine 201 operates with a high speed range taken in the transmission.

Figure 18:
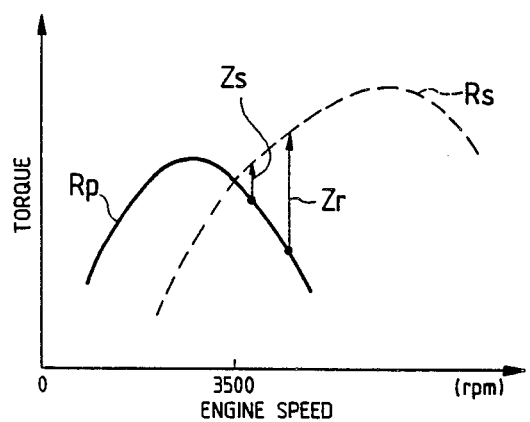

FIG. 18 is a characteristic chart showing torque curves for the engine 201 with an axis of abscissa representing engine speed and an axis of ordinate representing torque. In this characteristic chart, a solid line Rp indicates the torque curve obtained under the operating condition in which only the primary turbosupercharger 209 works and a broken line Rs indicates the torque curve obtained under the operating condition in which the primary and secondary turbosuperchargers 209 and 210 work simultaneously. Then, an arrow Zs indicates a torque variation arising on the occasion of the acceleration of the engine 201 in the case where the boundary of the two-charger operating area is shifted as mentioned above and an arrow Zr indicates a torque variation arising on the occasion of the acceleration of the engine 201 in the case where the boundary of the two-charger operating area is not shifted by way of comparison. It is apparent from such a characteristic chart that the torque variation indicated by the arrow Zs is much smaller than the torque variation indicated by the arrow Zr and this means that, in the case of the embodiment, a large torque shock is prevented from being brought about when the secondary turbosupercharger 210 starts working for accelerating the engine 201 under the condition in which the primary turbosupercharger 209 has worked.

One example of an operation program for controlling the exhaust cutoff valve 211, intake air cutoff valve 221 and relief valve 223 as described above is carried out in the control unit 235 in accordance with a flow chart shown in FIGS. 19-a, 19-b and 19-c.

According to the flow chart shown in FIGS. 19-a, 19-b and 19-c, first, in process 271, an initial arrangement for setting a flag F1 to be 1 and setting each of flags F2 to F6 to be 0 is conducted. As shown in FIG. 16, after the initial arrangement, the flag F1 is set to be 1 and each of the flags F2 to F6 is set to be 0 when the engine speed is decreased to cross the line L1 or the opening degree of throttle is decreased to cross the line L1, the flag F2 is set to be 1 and each of the flags F1 and F3 to F6 is set to be 0 when the engine speed is increased to cross the line L2 or the opening degree of throttle is increased to cross the line L2, the flag F3 is set to be 1 and each of the flags F1, F2 and F4 to F6 is set to be 0 when the engine speed is decreased to cross the line L3 or the opening degree of throttle is decreased to cross the line L3, the flag F4 is set to be 1 and each of the flags F1 to F3, F5 and F6 is set to be 0 when the engine speed is increased to cross the line L4 or the opening degree of throttle is increased to cross the line L4, the flag F5 is set to be 1 and each of the flags F1 to F4 and F6 is set to be 0 when the engine speed is decreased to cross the line L5 or the opening degree of throttle is decreased to cross the line L5, and the flag F6 is set to be 1 and each of the flags F1 to F5 is set to be 0 when the engine speed is increased to cross the line L6 or the opening degree of throttle is increased to cross the line L6.

Then, in process 272, the detection output signals Sa, Sn, St, Sp1 and Sp2 obtained from the sensors 204, 261, 262, 263 and 264 are stored. Further, opening degrees of throttle D1 and engine speeds N1 representing the line L1, opening degrees of throttle D2 and engine speeds N2 representing the line L2, opening degrees of throttle D3 and engine speeds N3 representing the line L3, opening degrees of throttle D4 and engine speeds N4 representing the line L4, opening degrees of throttle D5 and engine speeds N5 representing the line L5, and opening degrees of throttle D6 and engine speeds N6 representing the line L6 are stored, in process 273.

After that, in decision 274, it is checked whether the variation rate of intake air mass flow (dQ/dt), which is obtained based on the detection output signal Sa representing intake air mass flow Q in the intake passage 203, is lager than a predetermined value AA or not. If the variation rate of intake air mass flow is larger than the predetermined value AA, the opening degrees of throttle D1, D2, D3, D4, D5 and D6 and the engine speeds N1, N2, N3, N4, N5 and N6 stored in the process 273 are modified respectively to shift the lines L1 to L6 toward areas of smaller opening degree of throttle and lower engine speed on the characteristic chart of FIG. 16, in process 275. The modifications of the opening degrees of throttle D1, D2, D3, D4, D5 and D6 are performed by subtracting predetermined modifying values $\Delta D1$, $\Delta D2$, $\Delta D3$, $\Delta D4$, $\Delta D5$ and $\Delta D6$ from the opening degrees of throttle D1, D2, D3, D4, D5 and D6, and the modifications of the engine speeds N1, N2, N3, N4, N5 and N6 are performed by subtracting predetermined modifying values $\Delta N1$, $\Delta N2$, $\Delta N3$, $\Delta N4$, $\Delta N5$ and $\Delta N6$ from the engine speeds N1, N2, N3, N4, N5 and N6, respectively.

Then, in decision 276, it is checked whether the flag F1 is 1 or not. When the flag F1 is 1, it is checked whether engine speed N represented by the detection output signal Sn is higher than the engine speed N2 selected to correspond to the opening degree of throttle D2 which is equal to the opening degree of throttle D represented by the detection output signal St or not, in decision 277. If the engine speed N is equal to or lower than the selected engine speed N2, the step is returned to the process 272. On the other hand, if the engine speed N is higher than the selected engine speed N2, the flag F2 is set to be 1 in process 279, and the control signal E7 is supplied to the three-way solenoid valve 231 so that the relief valve 223 is closed, in process 280, then the step is returned to the process 272.

If it is clarified in the decision 274 that the variation rate of intake air mass flow (dQ/dt) is equal to or smaller than the predetermined value AA or it is clarified in the decision 276 that the flag F1 is 0, it is checked whether the flag F2, F4 or F6 is 1 or not in decision 281. When the flag F2, F4 or F6 is 1, it is further checked whether the flag F2 is 1 or not in decision 282. Then, if the flag F2 is 1, it is checked whether the engine speed N is higher then the engine speed N4 selected to correspond to the opening degree of throttle D4 which is equal to the opening degree of throttle D or not, in decision 283. When the engine speed N is higher than the selected engine speed N4, the flag F4 is set to be 1 in process 285, and the control signal E8 is supplied to the three-way solenoid valve 229 so that the exhaust cutoff valve 211 is opened, in process 286, then the step is returned to the process 272.

If it is clarified in the decision 283 that the engine speed N is equal to or lower than the selected engine speed N4, it is checked whether engine speed N is lower than the engine speed N1 selected to correspond to the opening degree of throttle D1 which is equal to the opening degree of throttle D or not in decision 287. If the engine speed N is equal to or higher than the selected engine speed N1, the step is returned to the process 272. On the other hand, if the engine speed N is lower than the selected engine speed N1, the flag F1 is set to be 1 in process 289, and the control signal E7 is supplied to the three-way solenoid valve 231 so that the relief valve 223 is opened, in process 290, then the step is returned to the process 272.

When it is clarified in the decision 282 that the flag F2 is 0, it is further checked whether the flag F4 is 1 or not in decision 291. Then, if the flag F4 is 1, it is checked whether the engine speed N is higher then the engine speed N6 selected to correspond to the opening degree of throttle D6 which is equal to the opening degree of throttle D or not, in decision 292. When the engine speed N is higher than the selected engine speed N6, the flag F6 is set to be 1 in process 294, and the control signal E6 is supplied to the three-way solenoid valve 227 so that the intake air cutoff valve 221 is opened, in process 295, then the step is returned to the process 272.

If it is clarified in the decision 292 that the engine speed N is equal to or lower than the selected engine speed N6, it is checked whether engine speed N is lower than the engine speed N3 selected to correspond to the opening degree of throttle D3 which is equal to the opening degree of throttle D or not in decision 296. If the engine speed N is equal to or higher than the selected engine speed N3, the step is returned to the process 272. On the other hand, if the engine speed N is lower than the selected engine speed N3, the flag F3 is set to be 1 in process 298, and the control signal E8 is supplied to the three-way solenoid valve 229 so that the exhaust cutoff valve 211 is closed, in process 299, then the step is returned to the process 272.

If it is clarified in the decision 291 that the flag F4 is 0, it is further checked whether engine speed N is lower than the engine speed N5 selected to correspond to the opening degree of throttle D5 which is equal to the opening degree of throttle D or not in decision 300. If the engine speed N is equal to or higher than the selected engine speed N5, the step is returned to the process 272. On the other hand, if the engine speed N is lower than the selected engine speed N5, the flag F5 is set to be 1 in process 302, and the control signal E6 is supplied to the three-way solenoid valve 227 so that the intake air cutoff valve 221 is closed, in process 303, then the step is returned to the process 272.

Further, when it is clarified in the decision 281 that none of the flags F2, F4 and F6 is 1, it is checked whether the flag F3 is 1 or not in decision 304. Then, if the flag F3 is 1, it is further checked whether the engine speed N is lower then the engine speed N1 selected to correspond to the opening degree of throttle D1 which is equal to the opening degree of throttle D or not, in decision 305. When the engine speed N is lower than the selected engine speed N1, the flag F1 is set to be 1 in process 307, and the control signal E7 is supplied to the three-way solenoid valve 231 so that the relief valve 223 is opened, in process 308, then the step is returned to the process 272.

If it is clarified in the decision 305 that the engine speed N is equal to or higher than the selected engine speed N1, it is checked whether engine speed N is higher than the engine speed N4 selected to correspond to the opening degree of throttle D4 which is equal to the opening degree of throttle D or not in decision 309. If the engine speed N is equal to or lower than the selected engine speed N4, the step is returned to the process 272. On the other hand, if the engine speed N is higher than the selected engine speed N4, the flag F4 is set to be 1 in process 311, and the control signal E8 is supplied to the three-way solenoid valve 229 so that the exhaust cutoff valve 211 is opened, in process 312, then the step is returned to the process 272.

When it is clarified in the decision 304 that the flag F3 is 0, it is further checked whether engine speed N is lower than the engine speed N3 selected to correspond to the opening degree of throttle D3 which is equal to the opening degree of throttle D or not in decision 313. If the engine speed N is lower than the selected engine speed N3, the flag F3 is set to be 1 in process 315, and the control signal E8 is supplied to the three-way solenoid valve 229 so that the exhaust cutoff valve 211 is closed, in process 316, then the step is returned to the process 272.

If it is clarified in the decision 313 that the engine speed N is equal to or higher than the selected engine speed N3, it is further checked whether engine speed N is higher than the engine speed N6 selected to correspond to the opening degree of throttle D6 which is equal to the opening degree of throttle D or not in decision 317. If the engine speed N is equal to or lower than the selected engine speed N6, the step is returned to the process 272. On the other hand, if the engine speed N is higher than the selected engine speed N6, the flag F6 is set to be 1 in process 319, and the control signal E6 is supplied to the three-way solenoid valve 227 so that the intake air cutoff valve 221 is opened, in process 320, then the step is returned to the process 272.

What is claimed is:

1. An air supply control system for an internal combustion engine comprising:

engine exhaust passages;

engine intake passages;

at least first and second turbosuperchargers each composed of a turbine disposed in one of exhaust passages of the engine and a blower connected through a shaft with the turbine and disposed in one of intake passages of the engine, an exhaust cutoff valve operative selectively to be open and closed respectively for opening and closing the exhaust passage in which the turbine of said second turbosupercharger is disposed, an intake air cutoff valve operative selectively to be open and closed respectively for opening and closing the intake passages in which the blower of said second turbosupercharger is disposed, cutoff valve control means operative to cause both said exhaust cutoff valve and said intake air cutoff valve to be closed when intake air mass flow fed to the engine is detected to be within a first operating area in which the intake air mass flow is relatively small and to cause both said exhaust cutoff valve and said intake air cutoff valve to be open when intake air mass flow fed to the engine is detected to be in a second operating area in which the intake air mass flow is relatively large, so that said first turbosupercharger works for supercharging the engine when the intake air mass flow fed to the engine is relatively small and both of said first and second turbosuperchargers work simultaneously for supercharging the engine when the intake air mass flow fed to the engine is relatively large, memory means for storing said first and second operating areas, engine operation detecting means for detecting an operating condition of the engine, and operation control means for varying said first and second operating areas so that a boundary between said first and second operating areas can be varied in response to the operating condition detected by said engine operation detecting means.

2. An air supply control system according to claim 1, wherein said cutoff valve control means is operative to cause said intake air cutoff valve to be delayed to open compared with said exhaust cutoff valve when the intake air mass flow fed to the engine is relatively large.

3. An air supply control system according to claim 1, wherein said operating characteristic memory means stores said first and second operating areas on a coordinate plane defined by coordinate axes representing respectively engine speed and engine load.

4. An air supply control system according to claim 3, wherein said coordinate axes of the memory means chart includes an axis of abscissa representing the engine speed and an axis of ordinate representing the engine load.

5. An air supply control system according to claim 1, wherein said engine operation detecting means is arranged to detect a cold engine operating condition in which the engine operates with a relatively low temperature before having been warmed up sufficiently and said operation controlling means operates to vary the boundary between said first and second operating areas so as to narrow said second operating area when said cold engine operating condition is detected by said engine operation detecting means.

6. An air supply control system according to claim 5, wherein said engine operation detecting means is operative to detect said cold engine operating condition based on cooling water temperature in the engine.

7. An air supply control system according to claim 5, wherein said exhaust passages are merged into each other to be coupled with an exhaust emission purifying catalyzer at a location downstream to said first and second turbosuperchargers.

8. An air supply control system according to claim 1, wherein said engine operation detecting means is arranged to detect speed ranges taken selectively in a transmission connected with the engine for detecting an engine operating condition in which the engine operates with a high speed range taken in the transmission and said operation controlling means operates to vary the boundary between said first and second operating areas so as to extend said second operating area when said engine operating condition in which the engine operates with a high speed range is detected by said engine operation detecting means.

9. An air supply control system according to claim 1, wherein said engine operation detecting means is arranged to detect speed ranges taken selectively in a transmission connected with the engine for detecting engine operating conditions in which the engine operates with high and low speed ranges taken in the transmission, respectively, and said operation controlling means operates to vary the boundary between said first and second operating areas in such a manner that said second operating area under the engine operating condition in which the engine operates with the high speed range is extended compared with that under the engine operating condition in which the engine operates with the low speed range.

10. An air supply control system according to claim 1, wherein said engine operation detecting means is arranged to detect octane numbers of fuel supplied to the engine for detecting an engine operating condition in which the engine operates with fuel having a relatively low octane number and said operation controlling means operates to vary the boundary between said first and second operating areas so as to extend said second operating area when said engine operating condition in which the engine operates with fuel having a relatively low octane number is detected by said engine operation detecting means.

11. An air supply control system according to claim 10, wherein said engine operation detecting means is operative to detect the octane numbers of fuel based on spark retard values set for the engine in accordance with a detection output of a knocking sensor provided on the engine.

12. An air supply control system according to claim 1, wherein said engine operation detecting means is arranged to detect an accelerating condition in which the engine is accelerated and said operation controlling means operates to vary the boundary between said first and second operating areas so as to extend said second operating area when said accelerating condition is detected by said engine operation detecting means.

13. An air supply control system according to claim 12, wherein said engine operation detecting means is operative to detect said accelerating condition in which the engine is accelerated based on a variation rate of intake air mass flow.

14. An air supply control system according to claim 12, wherein said operation controlling means is operative to vary the boundary between said first and second operating areas in such a manner that an extension of said second operating area is increased in accordance with increment of acceleration of the engine.

15. An air supply control system according to claim 12, wherein said operation controlling means is operative vary the boundary between said first and second operating areas in such a manner that an extension of said second operating area under a condition in which the engine operates with a low speed range taken in a transmission connected with the engine is increased compared with that under a condition in which the engine operates with a high speed range taken in the transmission.

* * * * *